US011632384B2

(12) United States Patent
Sasaki

(10) Patent No.: US 11,632,384 B2
(45) Date of Patent: *Apr. 18, 2023

(54) INFORMATION PROCESSING DEVICE AND INFORMATION PROCESSING METHOD

(71) Applicant: PANASONIC INTELLECTUAL PROPERTY CORPORATION OF AMERICA, Torrance, CA (US)

(72) Inventor: Takamitsu Sasaki, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/113,266

(22) Filed: Dec. 7, 2020

(65) Prior Publication Data

US 2021/0112085 A1 Apr. 15, 2021

Related U.S. Application Data

(63) Continuation of application No. 16/241,026, filed on Jan. 7, 2019, now Pat. No. 10,893,063, which is a
(Continued)

(30) Foreign Application Priority Data

Oct. 12, 2017 (JP) .............................. JP2017-198793

(51) Int. Cl.
*G06F 21/00* (2013.01)
*H04L 9/40* (2022.01)
(Continued)

(52) U.S. Cl.
CPC ...... *H04L 63/1425* (2013.01); *G06F 11/3476* (2013.01); *G07C 5/008* (2013.01);
(Continued)

(58) Field of Classification Search
None
See application file for complete search history.

(56) References Cited

U.S. PATENT DOCUMENTS 6,182,171 B1 * 1/2001 Akatsuka .............. H04L 12/403
701/1
6,285,931 B1 9/2001 Hattori et al.
(Continued)

FOREIGN PATENT DOCUMENTS

| EP | 2680534 | 1/2014 |
| JP | 2012-208646 A | 10/2012 |
| JP | 2014-146868 | 8/2014 |

OTHER PUBLICATIONS

International Search Report of PCT Application No. PCT/JP2017/040726, dated Jan. 30, 2018.
(Continued)

*Primary Examiner* — Maung T Lwin
(74) *Attorney, Agent, or Firm* — Greenblum & Bernstein, P.L.C.

(57) ABSTRACT

An information processing device capable of reducing an amount of data to be monitored in an onboard system is provided. The information processing device obtains a first log including, per unit time, some communication data flowing through the onboard system. The information processing device determines whether an abnormality is included in the communication data, using the first log. In a case where the abnormality is included in the communication data, the information processing device outputs first detection results to the onboard system. The first detection results cause transmission of a second log from the onboard system. The second log includes, per unit time, more of the communication data than the first log.

14 Claims, 23 Drawing Sheets

Related U.S. Application Data continuation of application No. PCT/JP2017/040726, filed on Nov. 13, 2017.

(60) Provisional application No. 62/430,440, filed on Dec. 6, 2016.

(51) Int. Cl.

| | | |
|---|---|---|
| *H04L 43/024* | (2022.01) | |
| *H04L 43/062* | (2022.01) | |
| *H04L 43/04* | (2022.01) | |
| *H04L 12/66* | (2006.01) | |
| *G06F 11/34* | (2006.01) | |
| *G07C 5/00* | (2006.01) | |
| *H04L 67/00* | (2022.01) | |
| *H04L 12/46* | (2006.01) | |
| *H04W 4/44* | (2018.01) | |
| *H04L 12/40* | (2006.01) | |

(52) U.S. Cl.
CPC .......... *H04L 12/4625* (2013.01); *H04L 12/66* (2013.01); *H04L 43/024* (2013.01); *H04L 43/04* (2013.01); *H04L 43/062* (2013.01); *H04L 67/34* (2013.01); *H04W 4/44* (2018.02); *H04L 2012/40215* (2013.01); *H04L 2012/40273* (2013.01)

(56) References Cited

U.S. PATENT DOCUMENTS

| | | | |
|---|---|---|---|
| 6,360,152 B1 | 3/2002 | Ishibashi et al. | |
| 6,944,649 B1 | 9/2005 | Suzuki | |
| 8,374,825 B2 | 2/2013 | Vock et al. | |
| 8,781,715 B2* | 7/2014 | Breed | G07C 5/008 |
| | | | 455/500 |
| 8,825,270 B2* | 9/2014 | Chen | G07C 5/006 |
| | | | 702/119 |
| 9,064,422 B2 | 6/2015 | Mohn et al. | |
| 9,292,978 B2 | 3/2016 | Hunt | |
| 9,450,911 B2* | 9/2016 | Cha | H04L 65/611 |
| 9,600,541 B2* | 3/2017 | Choi | G06F 16/2465 |
| 9,888,885 B2 | 2/2018 | An et al. | |
| 2006/0025966 A1* | 2/2006 | Kanamaru | G07C 5/008 |
| | | | 702/184 |
| 2007/0075847 A1 | 4/2007 | Oyagi et al. | |
| 2007/0133578 A1* | 6/2007 | Tani | H04L 45/742 |
| | | | 370/401 |
| 2008/0255721 A1* | 10/2008 | Yamada | G07C 5/008 |
| | | | 701/31.4 |
| 2009/0015684 A1* | 1/2009 | Ooga | G08G 1/0175 |
| | | | 348/222.1 |
| 2009/0228170 A1 | 9/2009 | Taki | |
| 2010/0332072 A1* | 12/2010 | Ishiko | B60T 17/221 |
| | | | 701/29.5 |
| 2011/0130916 A1 | 6/2011 | Mayer | |
| 2012/0053778 A1 | 3/2012 | Colvin et al. | |
| 2012/0253548 A1 | 10/2012 | Davidson | |
| 2014/0005880 A1* | 1/2014 | Guenkova-Luy | H04L 67/12 |
| | | | 701/31.4 |
| 2014/0031005 A1* | 1/2014 | Sumcad | H04W 4/48 |
| | | | 455/405 |
| 2014/0297108 A1* | 10/2014 | Koyama | G07C 5/00 |
| | | | 701/36 |
| 2014/0350772 A1 | 11/2014 | Saito | |
| 2015/0207709 A1 | 7/2015 | Hanckel et al. | |
| 2015/0246613 A1 | 9/2015 | Shimazu et al. | |
| 2015/0358351 A1 | 12/2015 | Otsuka et al. | |
| 2016/0217690 A1 | 7/2016 | Yamasaki et al. | |
| 2016/0350985 A1 | 12/2016 | McQuade et al. | |
| 2017/0013005 A1* | 1/2017 | Galula | H04L 67/12 |
| 2018/0137692 A1* | 5/2018 | Ohmert | G07C 5/008 |

OTHER PUBLICATIONS

The Extended European Search Report from the European Patent Office (EPO), dated Nov. 18, 2019, for the related European Patent Application No. 17877990.6.

The Extended European Search Report from the European Patent Office (EPO), dated Nov. 22, 2019, for the related European Patent Application No. 17879597.7.

* cited by examiner

FIG. 2

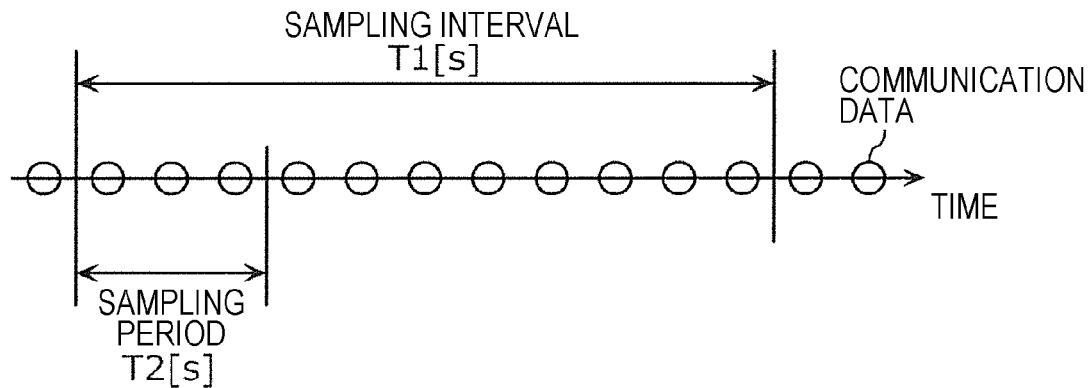

FIG. 3

| | SAMPLING LOG | FULL LOG |
|---|---|---|
| OBJECT | MONITORING IN NORMAL TIMES | DETAILED ANALYSIS AND PRESERVATION OF EVIDENCE WHEN ABNORMALITY DETECTED |
| REDUCTION OF TYPES | YES/PARTICULAR TYPES | NO/ALL TYPES |
| THINNING OUT OF PERIODS | YES/ INTERMITTENT PERIODS | NO/CONTINUOUS PERIODS |
| DATA COMPRESSION | YES | YES |
| DATA AMOUNT | SMALL | LARGE |
| TRANSMISSION | PERIODIC | WHEN ABNORMALITY DETECTED |

| | DATA SIZE [KB] | | | | | | |
|---|---|---|---|---|---|---|---|
| | UNCOMPRESSED | zip | cab | gzip | bzip2 | lzh | 7z |
| FIRST TYPE | 3.6 | 1.9 | 1.7 | 1.7 | 1.7 | 1.7 | 1.5 |
| SECOND TYPE | 3.6 | 0.9 | 0.9 | 0.8 | 0.9 | 0.8 | 0.8 |
| THIRD TYPE | 3.6 | 1.6 | 1.5 | 1.5 | 1.5 | 1.5 | 1.3 |
| FOURTH TYPE | 3.6 | 1.0 | 0.9 | 0.9 | 0.8 | 0.9 | 0.9 |
| TOTAL | 14.4 | 5.5 | 5.0 | 4.8 | 5.0 | 5.0 | 4.4 |

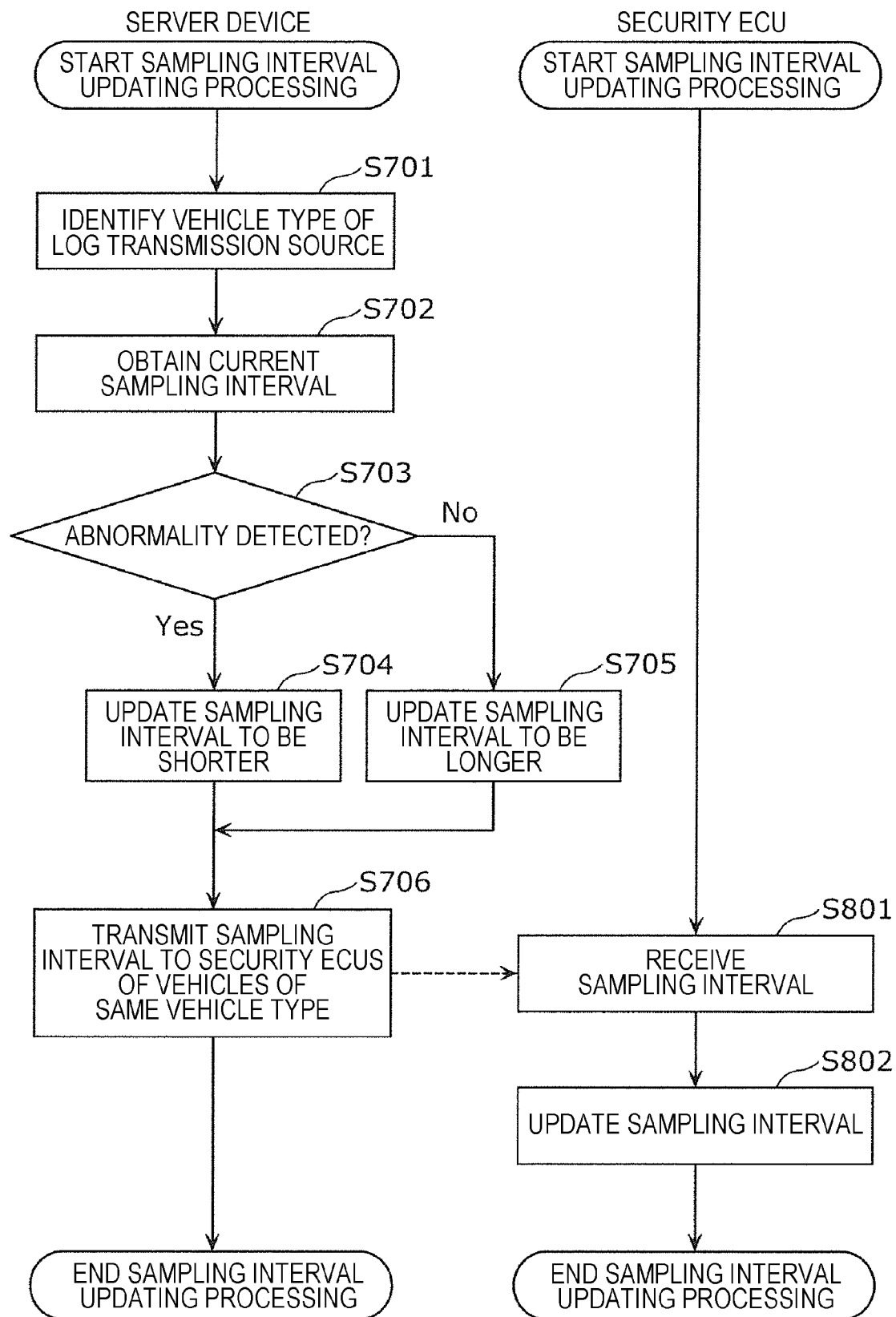

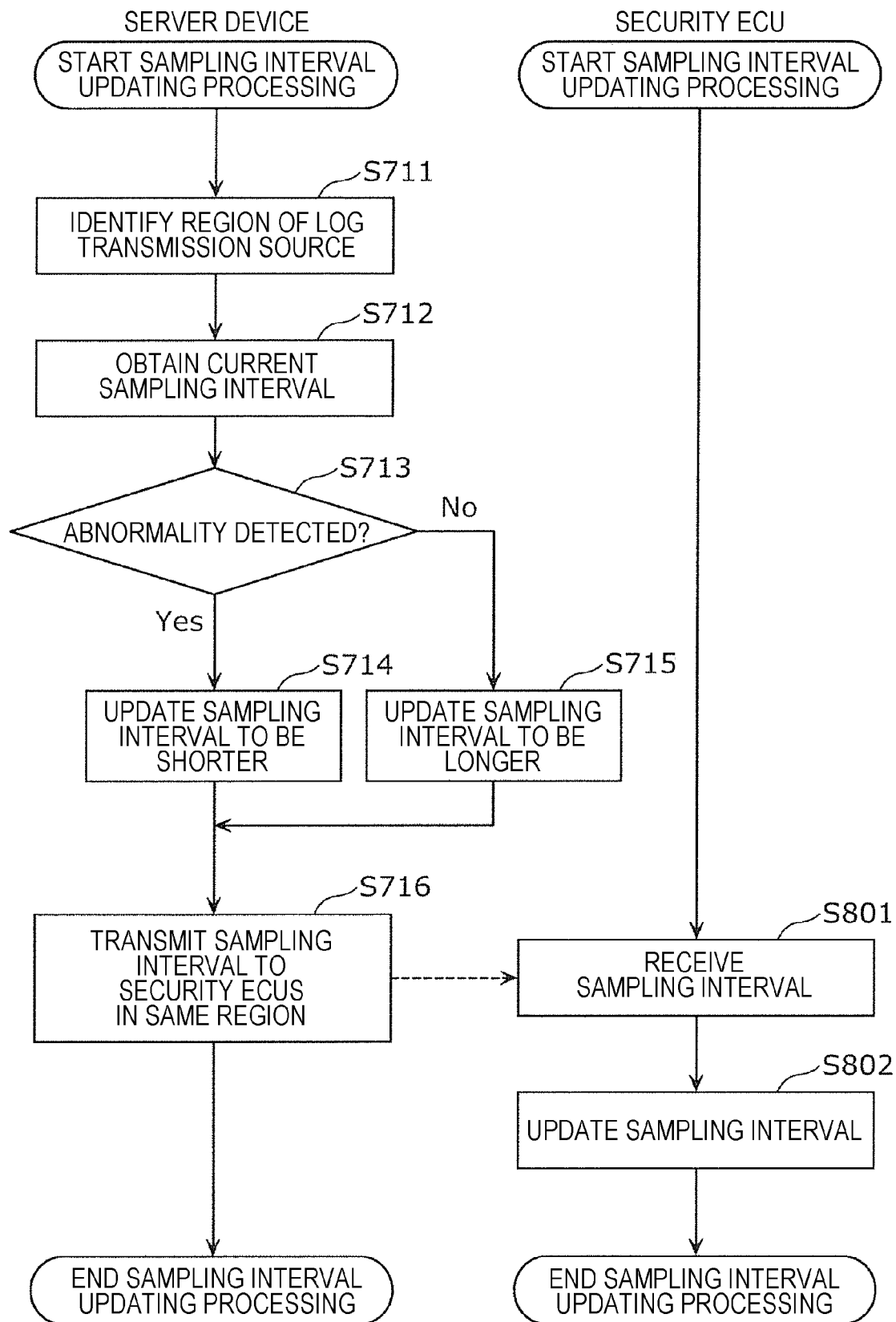

INFORMATION PROCESSING DEVICE AND INFORMATION PROCESSING METHOD

CROSS REFERENCE TO RELATED APPLICATIONS

This is a continuation of U.S. patent application Ser. No. 16/241,026, filed Jan. 7, 2019, which is a continuation of International Patent Appl. No. PCT/JP2017/040726, filed Nov. 13, 2017, which claims priority to Japanese Patent Appl. No. 2017-198793, filed Oct. 12, 2017, and the benefit of U.S. Provisional Patent Appl. No. 62/430,440, filed Dec. 6, 2016. The entire disclosure of each of the above-identified documents, including the specification, drawings, and claims, is incorporated herein by reference in its entirety.

BACKGROUND

1. Technical Field

The present disclosure relates to an information processing device provided outside of a vehicle, and so forth.

2. Description of the Related Art

Japanese Unexamined Patent Application Publication No. 2014-146868 discloses technology for detecting infiltration of unauthorized data in an onboard network or the like.

SUMMARY

However, there are cases where it is difficult for onboard systems in individual vehicles to singlehandedly monitor data on the onboard system in an appropriate manner and maintain and appropriate monitoring level. On the other hand, in a case of a system outside of the vehicle monitoring data on the onboard system, there is a possibility of a great amount of data to be monitored being externally transmitted from the onboard system. It is not easy to prepare resources for processing such a great amount of data to be monitored.

One non-limiting and exemplary embodiment provides an information processing device that can reduce the amount of data to be monitored that is transmitted from the onboard system, while maintaining an appropriate monitoring level.

In one general aspect, the techniques disclosed here feature an information processing device provided outside of a vehicle. The information processing device includes a processor, and a memory including at least one set of instructions that, when executed by the processor, causes the processor to perform operations including: obtaining a first log from an onboard system of the vehicle, the first log being a log of communication data on an onboard network of the vehicle; determining whether an abnormality is included in the communication data, using the first log; and outputting, in a case where the abnormality is determined to be included in the communication data, first detection results indicating the abnormality is included in the communication data to the onboard system. The first detection result is output, as a transmission instruction to cause transmission of a second log from the onboard system to the information processing device. The second log is a log of the communication data on the onboard network of the vehicle and includes a larger amount of data generated per unit time than the first log.

An information processing device and so forth according to an aspect of the present disclosure can reduce the amount of data to be monitored that is transmitted from the onboard system, while maintaining an appropriate monitoring level.

It should be noted that these general or specific embodiments may be implemented as a system, a device, a method, an integrated circuit, a computer program, or a computer-readable non-transitory recording medium such as a CD-ROM, and may be realized by any combination of a system, device, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 2 is a schematic diagram illustrating a sampling period according to the embodiment;

FIG. 3 is a comparative diagram of a sampling log and full log according to the embodiment;

FIG. 26 is a flowchart illustrating a first form of sampling-interval updating processing carried out at the server device and security ECU in a specific example; and FIG. 27 is a flowchart illustrating a second form of sampling-interval updating processing carried out at the server device and security ECU in a specific example.

DETAILED DESCRIPTION

Figure 1:
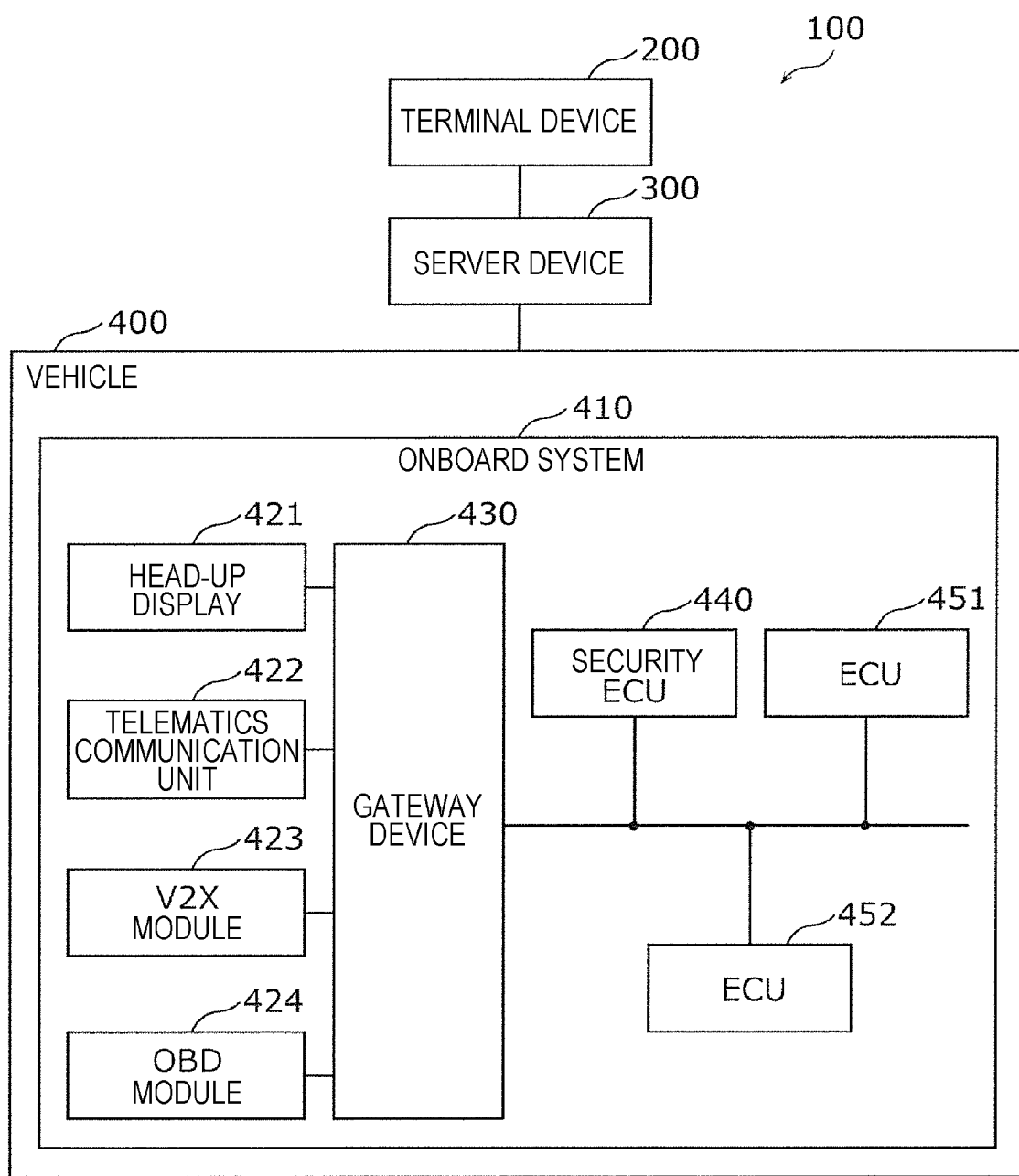
FIG. 1 is a block diagram illustrating a configuration of a security system according to an embodiment.

Underlying Knowledge Forming Basis of the Present Disclosure

In recent years, connected cars, which are connected to an external network, are becoming commonplace. For example, the number of automobiles connected to the Internet may reach 250 million by the year 2020.

On the other hand, it has begun to be pointed out that there is a possibility of vehicles being unauthorizedly controlled. Particularly, the possibility of unauthorized data infiltrating a Controller Area Network (CAN) that is in widespread use as a communication standard for onboard networks is being pointed out. Vehicles may be unauthorizedly controlled by unauthorized data. Accordingly, technology to protect vehicles from unauthorized data is being studied, so that vehicles will not be unauthorizedly controlled.

For example, an onboard system that is a system installed in each vehicle may monitor data in the onboard system to protect the vehicle from unauthorized data. However, an onboard system is installed in a vehicle, and there are cases that processing capabilities thereof are insufficient. Accordingly, there are cases where it is difficult for onboard systems in individual vehicles to singlehandedly monitor data on the onboard system in an appropriate manner and maintain and appropriate monitoring level.

Also, a system outside of the vehicle may monitor data on the onboard system. However, in this case, there is a possibility of a great amount of data to be monitored being externally transmitted from the onboard system. It is not easy to prepare resources for processing such a great amount of data to be monitored.

Accordingly, an information processing device according to an aspect of the present disclosure is an information processing device provided outside of a vehicle. The information processing device includes a processor, and a memory including at least one set of instructions that, when executed by the processor, causes the processor to perform operations including: obtaining a first log from an onboard system of the vehicle, the first log being a log of communication data on an onboard network of the vehicle; determining whether an abnormality is included in the communication data, using the first log; and outputting, in a case where the abnormality is determined to be included in the communication data using the first log, first detection results indicating the abnormality is included in the communication data to the onboard system. The first detection results may be output, as a transmission instruction to cause transmission of a second log from the onboard system to the information processing device. The second log may be a log of the communication data on the onboard network of the vehicle and may include a larger amount of data generated per unit time than the first log.

Accordingly, a sampling log that is relatively small in data amount is obtained from the onboard system, and abnormality of communication data is determined. When an abnormality occurs, a full log of which the data amount is relatively large is transmitted form the onboard system. Also, the information processing device can use plentiful processing resources, unrestricted by onboard requirements for example, to monitor and analyze sampling logs and full logs. Accordingly, the information processing device can reduce the amount of data to be monitored that is transmitted from the onboard system, while maintaining an appropriate monitoring level.

For example, the operations may further include: obtaining the second log from the onboard system after outputting the first detection results including the transmission instruction; and further determining whether the abnormality is included in the communication data, using the second log.

Accordingly, the information processing device can appropriately determine whether or not there is an abnormality included in the communication data, following the full log obtained from the onboard system when there is an abnormality.

Also, for example, the operations may further include: not outputting second detection results to the onboard system in a case where the abnormality is determined to be included in the communication data using the second log.

Accordingly, the information processing device can suppress full logs being redundantly transmitted from the onboard system due to abnormality detection results being redundantly transmitted.

Also, for example, the operations may further include: outputting the first detection results to a terminal device in the case where the abnormality is determined to be included in the communication data.

Accordingly, the information processing device can notify that an abnormality is included in communication data on the onboard network.

Also, for example, the first log may be the log of the communication data in a plurality of sampling periods. Each of the plurality of sampling periods may be included in one of a plurality of sampling intervals. Each of the plurality of sampling intervals may have a period of a first time duration. Each of the plurality of sampling periods may have a period of a second time duration that is shorter than the first time duration.

Accordingly, the data amount of sampling logs is appropriately reduced. Thus, the data amount of data to be monitored transmitted from the onboard system is appropriately reduced. The probability is high that unauthorized data for unauthorizedly controlling the vehicle will flow consecutively, so an abnormality or the like included in communication data can be appropriately analyzed by sampling logs in multiple sampling periods each included in multiple sampling intervals.

Also, for example, the operations may further include: outputting a change instruction to the onboard system that generates the first log, to change the first time duration within a range of being longer than the second time duration.

Accordingly, the information processing device can change the time duration of sampling intervals relating to sampling logs. Thus, the information processing device can cause sampling logs to include abnormalities and the like that would not be included in fixed sampling intervals.

Also, for example, the operations may further include: outputting, in the case where the abnormality is determined to be included in the communication data using the first log, the change instruction to the onboard system, to change the first time duration to become shorter within the range of being longer than the second time duration.

Accordingly, the information processing device can increase the data amount of sampling logs after an abnormality has occurred. The information processing device can also cause sampling logs to include abnormalities and the like that would not be included in long sampling intervals.

Also, for example, the operations may further include: outputting, in the case where the abnormality is determined to not be included in the communication data using the first log, the change instruction to the onboard system, to change the first time duration to become longer.

Accordingly, in a case where there is no abnormality, the information processing device can reduce the data amount of sampling logs.

Also, for example, the first time duration may be set for each of multiple types of the communication data. The operations may further include: outputting, in the case where the abnormality is determined to be included in the communication data using the first log regarding one type out of the multiple types of communication data, the change instruction to the onboard system, to shorten the first time duration within the range of being longer than the second time duration, with regard to the one type.

Accordingly, the information processing device can increase the data amount of sampling logs after an abnormality has occurred, by individual types.

Also, for example, the first time duration may be set for each of multiple types of communication data. The operations may further include: outputting, in the case where the abnormality is determined to be included in the communication data using the first log regarding one type out of the multiple types of communication data, the change instruction to the onboard system, to shorten the first time duration within the range of being longer than the second time duration, with regard to the multiple types of communication data.

Accordingly, the information processing device can increase the data amount of sampling logs after an abnormality has occurred, regardless of type. Thus, after an abnormality, the information processing device can include detailed information in sampling logs regardless of type.

Also, for example, the operations may further include: outputting, after the change instruction is output to the onboard system to shorten the first time duration and in a case where the abnormality is determined to not be included in the communication data, the change instruction to the onboard system to lengthen the first time duration that had been shortened.

Accordingly, in a case where there is no abnormality, the information processing device can reduce the increased data amount.

Also, for example, the operations may further include: outputting the change instruction to a plurality of onboard systems of a plurality of vehicles of which a vehicle type is same as the vehicle.

Accordingly, the information processing device can change the time duration of sampling intervals relating to sampling logs in multiple onboard systems of the same vehicle type.

Also, for example, the operations may further include: outputting the change instruction to a plurality of onboard systems of a plurality of vehicles of which a region is same as the vehicle.

Thus, the information processing device can change the time duration of sampling intervals relating to sampling logs in multiple onboard systems in the same region.

Also, for example, the second log may include a plurality of types of the communication data, and the first log may include one or more types of the communication data out of the plurality of types.

Accordingly, the data amount of sampling logs is appropriately reduced. Thus, the data amount of data to be monitored transmitted from the onboard system is appropriately reduced. Also, due to the plurality of types being reduced to the one or more types, a log of communication data of important types, for example, can be used as a sampling log.

Also, for example, the first log may be compressed by the onboard system, and the second log may be compressed by the onboard system. The operations may further include: decompressing the compressed first log; obtaining, from the onboard system, the second log that is compressed; and decompressing the compressed second log.

Accordingly, the sampling log and full log compressed at the onboard system and obtained from the onboard system are decompressed. Thus, the information processing device can reduce the data amount of data to be monitored transmitted from the onboard system.

Also, for example, the first log may be the log of the communication data in a plurality of sampling periods. Each of the plurality of sampling periods may be included in one of a plurality of sampling intervals. Each of the plurality of sampling intervals may have a period of a first time duration. Each of the plurality of sampling periods may have a period of a second time duration that is shorter than the first time duration. The first log may indicate, with regard to each frame of a plurality of frames composing the communication data in the plurality of sampling periods, (i) a sampling time of the frame, (ii) whether or not the frame is a first frame out of one or more frames of which a sampling period is same as the frame, and (iii) data of the frame. Regarding each frame of the plurality of frames, in a case where the frame is not the first frame out of the one or more frames of which the sampling period is the same as the frame, the determining may be with regard to whether the abnormality is included in the communication data using at least one of a difference between a sampling time of a frame before the frame in the one or more frames and a sampling time of the frame, and a difference between data of the frame before the frame and data of the frame.

Accordingly, the sampling log indicates, for each frame, the sampling time, whether or not the first frame in the sampling period, and so forth. The information processing device can appropriately determine an abnormality, by difference or the like between the sampling time of a frame that is not the first frame and the sampling time of a frame preceding that frame, in a sampling period.

Also, for example, an arrangement may be made where the second includes a plurality of types of the communication data. The first log may be the log of the communication data in a plurality of sampling periods. Each of the plurality of sampling periods may be included in one of a plurality of sampling intervals. Each of the plurality of sampling intervals may have a period of a first time duration. Each of the plurality of sampling periods may have a period of a second time duration that is shorter than the first time duration, and may be of one or more types of the communication data out of the plurality of types. The first log may indicate, with regard to each frame of a plurality of frames composing the communication data in the plurality of sampling periods, (i) a sampling time of the frame, (ii) whether or not the frame is a first frame out of one or more frames of which a type and a sampling period are same as the frame, and (iii) data of the frame. Regarding each frame of the plurality of frames, in a case where the frame is not the first frame out of the one or more frames of which the sampling period and the type are the same as the frame, the determining may with regard to whether the abnormality is included in the communication data using at least one of a difference between a sampling time of a frame before the frame in the one or more frames and a sampling time of the frame, and a difference between data of the frame before the frame and data of the frame.

Accordingly, the sampling log may indicate, for each frame, the sampling time, whether or not the first frame in the same sampling period and of the same type, and so forth. The information processing device can appropriately determine an abnormality, by difference or the like between the sampling time of a frame that is not the first frame and the sampling time of a frame preceding that frame, in the same sampling period and of the same type.

Also, an information processing method according to an aspect of the present disclosure is an information processing method performed by an information processing device provided outside of a vehicle. The information processing method includes: obtaining a first log from an onboard system of the vehicle, the first log being a log of communication data on an onboard network of the vehicle; determining whether an abnormality is included in the communication data, using the first log; and outputting, in a case where the abnormality is determined to be included in the communication data using the first log, first detection results indicating the abnormality is included in the communication data to the onboard system. The first detection results may be output, as a transmission instruction to cause transmission of a second log from the onboard system to the information processing device. The second log may be a log of the communication data on the onboard network of the vehicle and may include a larger amount of data generated per unit time than the first log.

Accordingly, a sampling log that is relatively small in data amount is obtained from the onboard system, and abnormality of communication data is determined. When an abnormality occurs, a full log of which the data amount is relatively large is transmitted form the onboard system. Also, the information processing device can use plentiful processing resources, unrestricted by onboard requirements for example, to monitor and analyze sampling logs and full logs.

Accordingly, the information processing device can reduce the amount of data to be monitored that is transmitted from the onboard system, while maintaining an appropriate monitoring level.

It should be noted that these general or specific embodiments may be implemented as a system, a device, a method, an integrated circuit, a computer program, or a computer-readable non-transitory recording medium such as a CD-ROM, and may be realized by any combination of a system, device, method, integrated circuit, computer program, and recording medium.

An embodiment will be described below in detail with reference to the drawings. Note that the embodiments described below are all comprehensive or specific examples of the present disclosure. Accordingly, values, shapes materials, components, placements and connected states of components, steps, the order of steps, and so forth, illustrated in the following embodiments, are only exemplary, and do not restrict the Claims. Components in the following embodiments which are not included in an independent Claim indicating a highest order concept are described as being optionally includable components.

Embodiment

Multilevel Protection and Remote Monitoring

FIG. 1 is a block diagram illustrating the configuration of a security system according to the present embodiment. A security system 100 illustrated in FIG. 1 includes a server device 300, an onboard system 410, and so forth. The onboard system 410 is a system installed in a vehicle 400, and includes a security electronic control unit (ECU) 440, other ECUs 451 and 452, and so forth. The ECU is also referred to as an engine control unit.

In the vehicle 400, the onboard system 410 performs multi-level protection of four levels. The first level is protection at an extra-vehicular communication device. The extra-vehicular communication device authenticates communication destinations, and encrypts communication in accordance with the situation. The extra-vehicular communication device is a head-up display 421, telematics communication unit (TCU) 422, vehicle-to-everything (V2X) module 423, on-board diagnostics (OBD) module 424, or the like.

For example, the head-up display 421 communicates with Bluetooth (registered trademark) devices, universal serial bus (USB) devices, or the like. The telematics communication unit 422 communicates with an external server and so forth. The V2X module 423 communicates with an infrastructure and so forth. The OBD module 424 communicates with an extra-vehicular diagnostic device and so forth.

An extra-vehicular communication device such as the head-up display 421 that has ample computation resources prevents infiltration of unauthorized data by performing filtering where communication data received from outside of the car is confirmed and only data permitted beforehand is permitted to pass, in addition to authentication and encryption.

The second level is protection at a gateway device 430. The gateway device 430 is also called a network gateway, connecting a network to which communication devices outside of the vehicle connect to, and a control system network installed in the vehicle 400. The control system network is also referred to as an onboard network, and specifically is a CAN. The gateway device 430 prevents infiltration of unauthorized data by performing filtering, where communication data received from outside of the car is confirmed and only data permitted beforehand is transferred to the control system network.

The third level is protection at the security ECU 440 disposed in the control system network. The security ECU 440 monitors communication data flowing over the control system network, and identifies and invalidates unauthorized data based on the format, cycle, amount of change in values, and so forth, of communication data. For example, the security ECU 440 may identify unauthorized data by matching communication data with a white list or rules. The security ECU 440 may also invalidate unauthorized data using a CAN error frame.

The fourth level is protection at the ECUs 451 and 452 and so forth. The ECUs 451 and 452 and so forth are implemented with anti-tampering. For example, the ECUs 451 and 452 and so forth may check that the software program has not been tampered with, by a secure boot. The ECUs 451 and 452 and so forth may also prevent tampering with software programs by using a software program of which the source code has been obfuscated.

Further, in addition to the multi-level protection at the onboard system 410, the security system 100 also performs remote monitoring of the vehicle 400 at the server device 300. For example, there is a possibility that increasingly sophisticated infiltration methods of unauthorized data may result in unauthorized data slipping through the multi-level protection. Accordingly, the server device 300 may detect infiltrating unauthorized data that has slipped through the multi-level protection. New protection measures may be employed, or the driver may be notified. Further, even in a case where unauthorized data is handled by the multi-level protection, it is useful to detect unauthorized access as an abnormality and to comprehend the trend in unauthorized access, to prevent infiltration by new unauthorized data.

Accordingly, the server device 300 collects and analyzes communication logs, that are logs of communication data on the onboard network. Further, the server device 300 outside of the vehicle 400 can collect and analyze many communication logs from not just one vehicle 400 but multiple vehicles. Various vehicle abnormalities and so forth can be comprehensively comprehended by the communication logs obtained from various vehicles in various regions. Accordingly, regions, time of day, vehicle types, and so forth, regarding which unauthorized access frequently occurs, can be identified.

Also, the server device 300 outside of the vehicle 400 can have plentiful computation resources, unrestricted by onboard requirements. Accordingly, the server device 300 outside of the vehicle 400 can perform complicated processing, such as high-level abnormality detection based on machine learning and so forth, for example. Thus, the server device 300 can detect unauthorized data, unauthorized access, or predictors or the like thereof, that the onboard system 410 cannot detect.

The server device 300 outside of the vehicle 400 may perform processing corresponding to Security Information Event Management (SIEM) to collect and analyze information. This processing is also expressed as Automotive SIEM (AutoSIEM).

Also, for example, a Security Operation Center (SOC) and Automotive Security Incident Response Team (ASIRT) may exist as organizations to run the security system 100. The SOC is an organization that monitors detection results at the server device 300, and the ASIRT is an organization that handles abnormalities in a case that abnormalities are detected.

In a case where an abnormality not detected by the multi-level protection has been detected at the server device 300, the ASIRT creates a new detection rule. The new detection rule that has been created may be distributed to the head-up display 421, security ECU 440, and so forth, by the server device 300.

A terminal device 200 connected to the server device 300 is a device that communicates with the server device 300, and is used by the SOC, ASIRT, or the like. For example, the terminal device 200 receives an abnormality notification from the server device 300.

Reduction in Data Amount

Communication logs are collected and analyzed by the server device 300, as described above. Accordingly, the onboard system 410 in the vehicle 400 uploads communication logs to the server device 300. The server device 300 accumulates and analyzes uploaded communication logs. Also, the SOC and ASIRT and so forth, for example, download communication logs from the server device 300 to the terminal device 200 for detailed analysis and preservation of evidence. That is to say, the terminal device 200 downloads communication logs from the server device 300 in accordance with instructions by the SOC and ASIRT and so forth.

Note however, that the greater the amount of communication log data being uploaded to the server device 300 is, the more resources are used for communication, accumulation, analysis, and so forth. For example, the bitrate of CAN is around 500 Kbps to 1 Mbps. In a case where the bitrate of CAN is assumed to be 500 Kbps, the data amount of a CAN communication log can be predicted to be around 225 MB per hour, even if overhead such as additional information is excluded. If ten thousand vehicles uploaded communication logs to the server device 300, the data amount of the communication logs uploaded to the server device 300 can be predicted to reach 2,250 GB per hour.

Preparing massive resources to handle such a great amount of data is not easy. Accordingly, the security system 100 according to the present embodiment has a configuration to reduce the amount of data to be monitored that is transmitted from the onboard system 410 to the server device 300, while maintaining an appropriate monitoring level.

Operation logs of the onboard devices in the onboard system 410 may be transmitted from the onboard system 410 to the server device 300 as data to be monitored. In the present embodiment, communication logs in particular are transmitted from the onboard system 410 to the server device 300 as data to be monitored.

In unauthorized access to the vehicle 400, there is a high probability that unauthorized data will flow over the onboard network. Accordingly, communication logs are useful in monitoring to protect the vehicle 400 from unauthorized access. On the other hand, the amount of data in a CAN communication log, which is an onboard network broadly employed in various vehicles, can be predicted to be great, as described above. That is to say, communication logs are useful for monitoring, but the amount of data is great.

Accordingly, the security system 100 according to the present embodiment particularly reduces the amount of data of communication logs transmitted from the onboard system 410 to the server device 300. Note that the security system 100 may further reduce the amount of data of operation logs transmitted from the onboard system 410 to the server device 300 using the same method.

The security system 100 uses three reduction methods to reduce the data amount of data to be monitored that is transmitted from the onboard system 410 to the server device 300. The data to be monitored of which data amount is reduced specifically is the communication log transmitted from the onboard system 410 to the server device 300.

The first reduction method is reduction of types. Specifically, out of the data frames of all types flowing over a CAN, only data frames of types having high importance are included in the data to be monitored that is transmitted from the onboard system 410 to the server device 300. For example, out of the data frames of various types flowing over the CAN, communication data regarding the accelerator, brakes, and so forth, is directly related to behavior of the car, but communication data related to the windows, windshield wiper, and so forth, is not directly related to behavior of the car.

Accordingly, out of the data frames of various types flowing over the CAN, only communication data directly related to behavior of the car is included in data to be monitored that is transmitted from the onboard system 410 to the server device 300, as communication data with a high degree of importance. For example, in a case where, out of a total of 100 types of data flowing over the CAN, only 20 types of data directly related to behavior of the car are included in the data to be monitored, appropriately 80% of the total of 100 types of data can be expected to be reduced. Note that in CAN, the type corresponds to the ID included in the data frame.

The second reduction method is period-based thinning out. Specifically, communication data for multiple sampling periods included in each of multiple sampling intervals is included in data to be monitored transmitted from the onboard system 410 to the server device 300.

FIG. 2 is a schematic diagram illustrating a sampling period used in the security system 100 illustrated in FIG. 1. In FIG. 2, the sampling period T2 is shorter than the sampling interval T1. Out of the communication data in the sampling interval T1, the communication data in the sampling period T2 is included in the data to be monitored transmitted from the onboard system 410 to the server device 300. Thus, (1−T2/T1)×100% of the data amount is reduced.

The sampling period T2 may be set in accordance with the number of smallest data frames for detecting abnormality at the server device 300, or the like. For example, in a case where at least a count of K data frames are used for abnormality detection algorithms at the server device 300, the sampling period T2 is stipulated so that the at least K data frames are present in the sampling period T2.

Specifically, in a case where absence or presence of abnormality is determined for each individual data frame by an abnormality detection algorithm, the above K is 1. Accordingly, in this case, the period for one cycle of data frames of the same type periodically flowing over the CAN can be stipulated as being the sampling period T2.

Also, the sampling interval T1 may be stipulated to be shorter than a period where infiltration of unauthorized data consecutively occurs. For example, in a CAN, data frames that flow sporadically affect the vehicle 400 little, while multiple data frames that flow consecutively greatly affect the vehicle 400. That is to say, sporadic infiltration of unauthorized data affects the vehicle 400 little, while consecutive infiltration of unauthorized data greatly affects the vehicle 400.

Accordingly, in a case where a period in which infiltration of the unauthorized data occurs consecutively is assumed to be five seconds, the sampling interval T1 may be stipulated to be shorter than five seconds. Accordingly, the abnormal data flowing over the CAN due to infiltration by unauthorized data can be included in the data to be monitored. Also, in a case where a period over which infiltration of unauthorized data is assumed to be long, the sampling interval T1 can be stipulated so as to be long. In this case, the effects of data amount reduction are great.

In a case where a period over which infiltration by unauthorized data will be consecutively performed is not readily assumable, the sampling interval T1 may be dynamically changed. The sampling interval T1 may be changed randomly at the timing of obtaining a communication log, or may be changed in accordance with vehicle type, region, or type. Accordingly, the probability of including abnormal data, flowing over the CAN due to infiltration by unauthorized data, in the data to be monitored that is transmitted form the onboard system 410 to the server device 300, is higher. Due to the sampling interval T1 and sampling period T2 being appropriately set, abnormal data flowing over the CAN is included in data to be monitored transmitted to the server device 300, and data to be monitored to be transmitted to the server device 300 is reduced.

The third reduction method is data compression. Specifically, the onboard system 410 may reduce the data amount of the data to be monitored transmitted to the server device 300 by compressing the data to be monitored by a data compression format such as zip, gzip, 7z, or the like.

Various data compression formats are implemented in various software programs for personal computers, and are in widespread use regarding data compression. For example, approximately 30 to 60% of the data amount of a binary file can be reduced by data compression. Reduction of data amount by data compression can be expected for data to be monitored belonging to binary files. In fact, data to be monitored was compressed, and as a result, 69.4% of data amount was reduced.

FIG. 3 is a comparison diagram of a sampling log and a full log used in the security system 100 illustrated in FIG. 1. The sampling log and full log are each communication logs in CAN, and are data to be monitored. The above-described three reduction methods are applied to the sampling log. That is to say, reduction of types, thinning out of periods, and data compression are applied to the sampling log. Only data compression out of the above-described three reduction methods is applied to the full log.

A sampling log includes only a part of communication logs out of all communication logs in CAN. Accordingly, the amount of data of the sampling log is relatively small. A sampling log also can include minimal data for detecting abnormalities included in communication data.

A full log basically includes all communication logs of CAN. Accordingly, the amount of data of a full log is relatively great. However, a full log can include detailed information relating to CAN communication data. That is to say, a full log can indicate an abnormality included in communication data in detail.

The security system 100 appropriately uses the two types of data to be monitored, which are the sampling log and full log, differently from each other. That is to say, the security system 100 selectively uses the sampling log and full log.

Specifically, the security system 100 generates a sampling log for monitoring in normal situations. The security system 100 periodically transmits the sampling log from the onboard system 410 to the server device 300. The security system 100 also generates a full log for detailed analysis for when an abnormality is detected, and for preservation of evidence. The security system 100 transmits the full log from the onboard system 410 to the server device 300 when an abnormality is detected.

Transmitting the full log when an abnormality is detected enables appropriate detailed analysis and preservation of evidence to be carried out. On the other hand, it is assumed that the frequency of abnormalities occurring is scarce, so the data amount of data to be monitored transmitted from the onboard system 410 to the server device 300 can approximate the data amount of a sampling log. Accordingly, the data amount of data to be monitored transmitted from the onboard system 410 to the server device 300 is small. Accordingly, deterioration of the monitoring level is suppressed, and the data amount of the data to be monitored transmitted from the onboard system 410 to the server device 300 is reduced.

Figure 4:
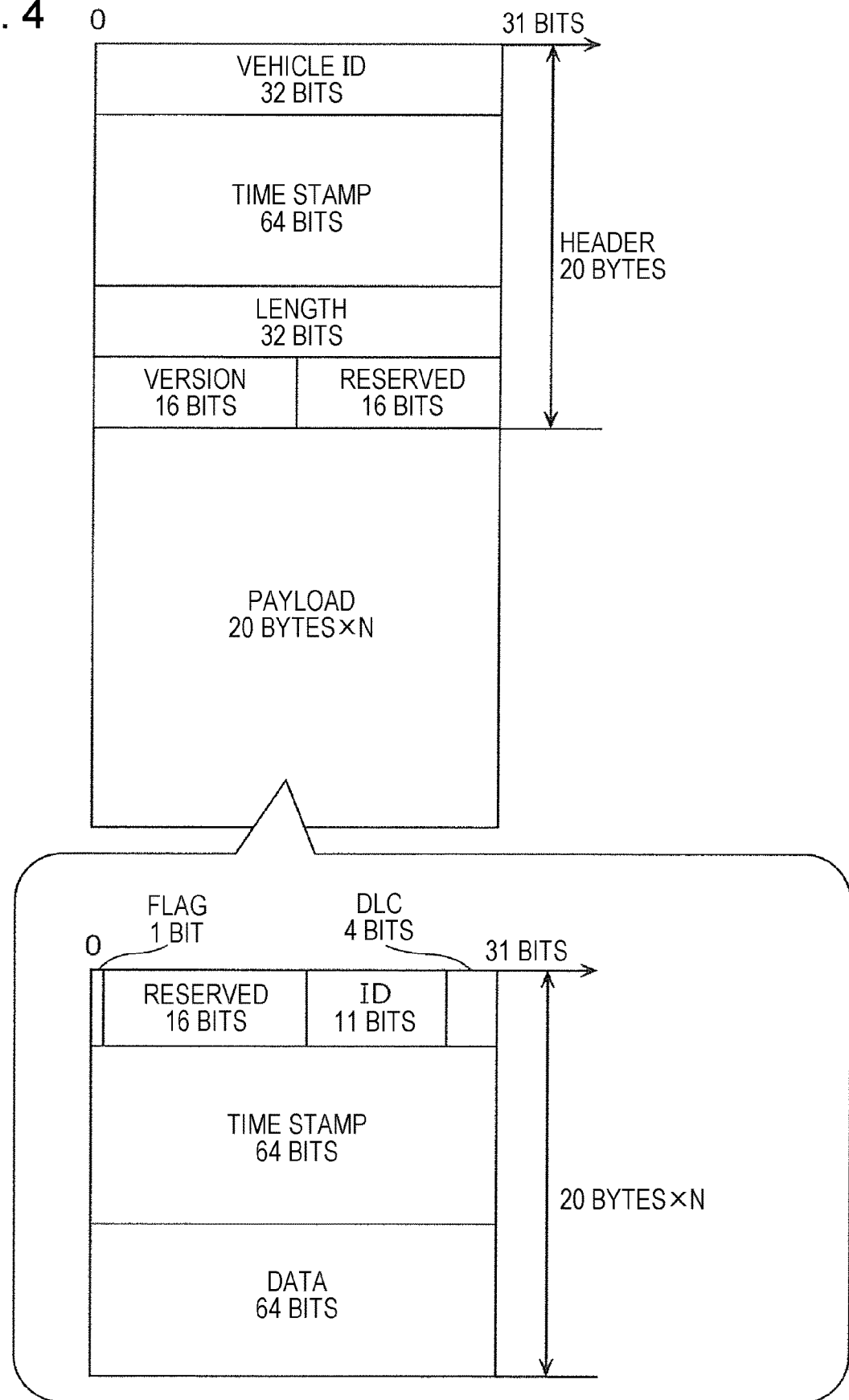
FIG. 4 is a data configuration diagram illustrating a log format according to the embodiment.

FIG. 4 is a data configuration diagram illustrating a log format used at the security system 100 illustrated in FIG. 1. The sampling log and full log are transmitted from the onboard system 410 to the server device 300 in the log format illustrated in FIG. 4.

Specifically, the header portion of the log format includes a vehicle ID, timestamp, length, version, and a reserved section. Further, N sets each configured of a set of a flag, reserved section, ID, data length code (DLC), timestamp, and data, are included in the payload portion of the log format.

The vehicle ID in the header portion indicates an identifier for identifying the vehicle 400 out of multiple vehicles. The time stamp in the header portion indicates the time at which the communication log is to be transmitted as a sampling log or full log. The length in the header portion indicates the length of the payload portion. The version in the header portion indicates the version of the log format. The reserved section in the header portion is an unused region in the header portion.

The flag in the payload portion indicates whether or not data in the set containing that flag is data of the first frame in the sampling period. That is to say, this flag indicates whether or not preceding data is missing. This flag may be made to indicate whether the data in the set including that flag is of the same type and is of the first frame in the same sampling period.

The reserved section in the payload portion is an unused section in the payload portion. The ID in the payload portion is an ID in the CAN frame, and indicates the type of communication data. The DLC in the payload portion is a DLC in the CAN frame, and indicates the length of the data in the payload portion. The time stamp in the payload portion indicates the sampling time, which is the time at which the CAN frame was obtained from the CAN onboard network. The data in the payload portion is data in the CAN frame.

The sampling log and full log may further include an identification flag for identifying whether a sampling log or full log. For example, such an identification flag is included in the header portion of the log format.

The present inventor has evaluated the amount of reduction of data to be monitored, based on sampling logs and full logs such as described above. Specifically, evaluation of the amount of reduction was performed by measuring the data amount of communication logs, sampling logs, and full logs, with regard to actual communication data for one minute on a CAN. The communication logs in the evaluation are logs regarding which data amount is not reduced, and are the same as full logs before compression. The data amount of a communication log was 1158 KB.

First, reduction of types was applied. Specifically, out of the approximately 100 types of communication data in CAN, the four types of communication data regarding steering, accelerator, brakes, and vehicle speed, that are deeply involved with control of the car, were used to generate a sampling log. The data amount of the sampling log subjected to application of type reduction was 200 KB. That is to say, 82.7% of the data amount was reduced in comparison with the data amount of the original communication log.

Next, in addition to reduction of types, thinning out of periods was applied. In doing so, the time duration of the sampling period was fixed to 72 ms, and the data amount of sampling logs of the communication data was measured with varying time durations of sampling intervals.

Figures 5, 6:
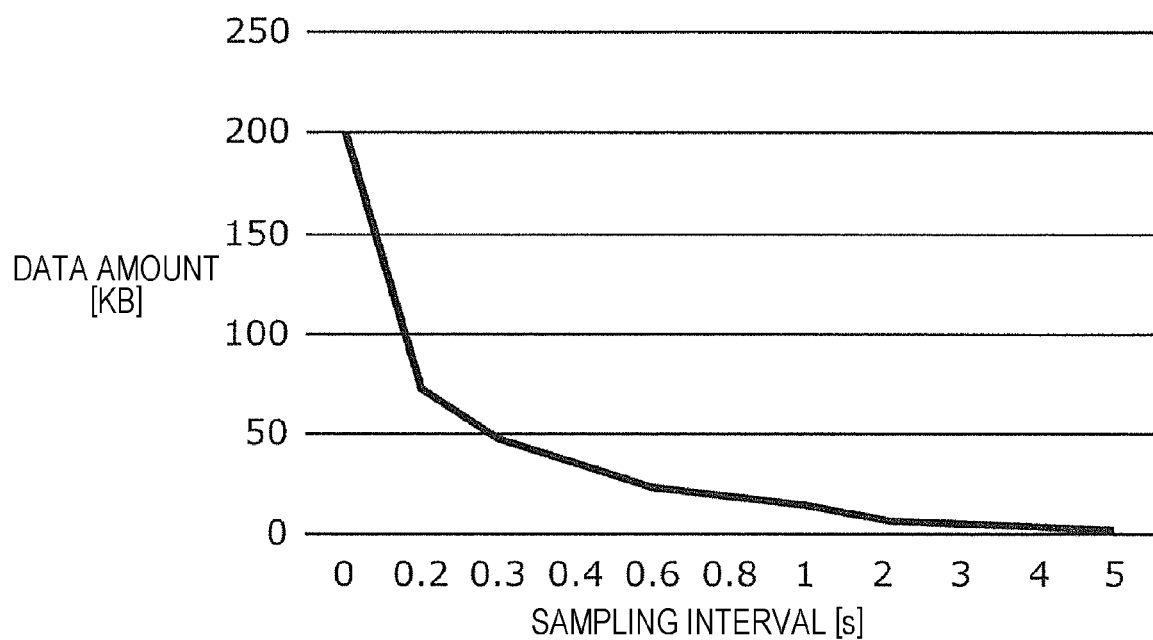
FIG. 5 is a graph illustrating the relation between sampling interval and data amount.
FIG. 6 is a comparative diagram illustrating data amount before and after compression.

FIG. 5 is a graph illustrating the relation between sampling intervals and the data amount of sampling logs. The sampling interval and the data amount of sampling logs are in a relation where the longer the sampling interval is, the smaller the data amount of the sampling log is, as illustrated in FIG. 5. In the present evaluation, a sampling interval of one second was ultimately employed. As a result, the data amount of the sampling log to which thinning out of periods was applied was 14.4 KB. That is to say, data amount was reduced from 200 KB to 14.4 KB, by 92.8%.

Further, data compression was applied. Specifically, sampling logs were compressed using the seven types of compression formats of zip, cab, gzip, bzip2, lzh, and 7z, and the data amounts after compression were compared.

FIG. 6 is a comparison diagram illustrating the data amounts before and after compression. The first through fourth types here corresponding to the four types of steering, accelerator, brakes, and vehicle speed. The compression format with the highest compression efficiency was 7z, as illustrated in FIG. 6, with the data amount of the sampling log compressed by 7z being 4.4 KB. That is to say, data amount was reduced from 14.4 KB to 4.4 KB, by 69.4%.

Note that more continuous 0 values were observed in the second type and fourth type data, as compared to the first type and third type data. Accordingly, this is estimated to be the reason why a higher compression efficiency was obtained for the second type and fourth type data.

Ultimately, a sampling log of 4.4 KB was generated by reduction of types, thinning out of periods, and compression. That is to say, the data amount was reduced from 1158 KB to 4.4 KB, by 99.6%.

Also, the amount of data of the communication log compressed using 7z, more specifically, the data amount of a full log compressed using 7z, was 462 KB. That is to say, with regard to a full log, the data amount was reduced from 1158 KB to 462 KB, by 60.1%.

As described above, evaluation results were obtained where data amount was reduced in both the sampling log and full log, and a greater amount of data was reduced in the sampling log than the full log. Sampling logs are transmitted from the onboard system 410 to the server device 300 at normal times, so it can be expected that the data amount of data to be monitored transmitted from the onboard system 410 to the server device 300 will be appropriately reduced.

Basic Configuration

Figure 7:
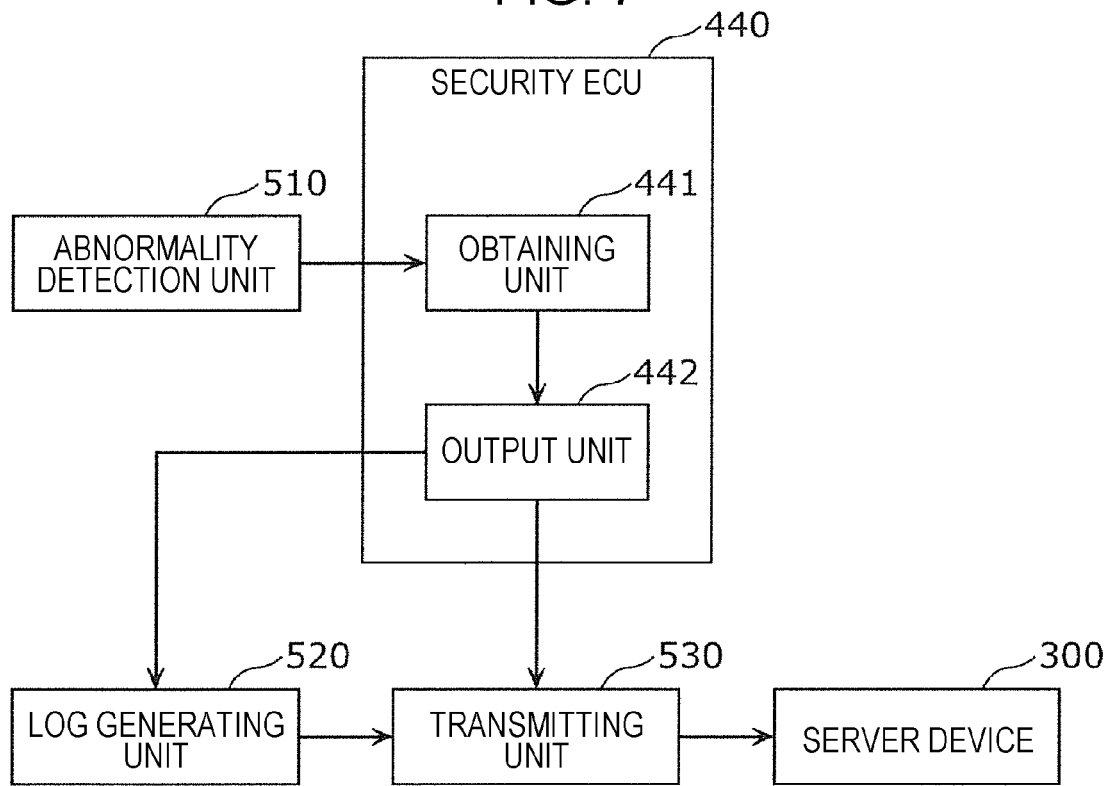
FIG. 7 is a block diagram illustrating a basic configuration of a security ECU according to the embodiment.

Next, the basic configuration for reducing the data amount of data to be monitored transmitted from the onboard system 410, while maintaining an appropriate monitoring level, will be described. FIG. 7 is a block diagram illustrating a basic configuration of the security ECU 440 according to the present embodiment. The security ECU 440 is an example of an information processing device installed in the vehicle 400. The security ECU 440 includes an obtaining unit 441 and an output unit 442.

The obtaining unit 441 obtains information. Specifically, the obtaining unit 441 obtains abnormality detection results regarding whether or not an abnormality is included in communication data on the onboard network of the vehicle 400, from an abnormality detection unit 510.

The output unit 442 outputs information. Specifically, the output unit 442 outputs a sampling log transmission instruction to periodically transmit a sampling log from a transmitting unit 530 installed in the vehicle 400 to the server device 300 outside of the vehicle 400. The output unit 442 also outputs a full log transmission instruction for the transmitting unit 530 to transmit a full log to the server device 300 in a case where abnormality detection results indicating that an abnormality is included in the communication data have been obtained.

Now, a sampling log is a log that, out of two types of logs of communication data, has a smaller data amount generated per unit time than the other log. A full log is a log that, out of two types of logs, has a greater data amount generated per unit time than the other log.

For example, a full log may be a log of multiple types of communication data. A sampling log may be a log of communication data of at least one or more type but less than the multiple types relating to the full log.

A sampling log may be a log of communication data in, out of multiple sampling intervals, multiple sampling periods included in each of multiple sampling intervals. Note that each of multiple sampling intervals is a period of a first time duration. Each of multiple sampling periods is a second time duration that is shorter than the first time duration.

A sampling log may indicate, with regard to each frame making up communication data in multiple sampling periods, (i) sampling time of the frame, (ii) whether or not the frame is a first frame, and (iii) data of the frame. Whether or not the frame is the first frame is whether or not the frame is the first frame out of one or more frames having the same sampling period as the frame, for example.

Also, a sampling log may indicate, with regard to each frame making up communication data of one or more types in multiple sampling periods, (i) sampling time of the frame, (ii) whether or not the frame is a first frame, and (iii) data of the frame. Whether or not the frame is the first frame is whether or not the frame is the first frame out of one or more frames having the same type and sampling period as the frame, for example.

A log generating unit 520 obtains communication data from the onboard network and generates full logs and sampling logs, in accordance with the communication data, for example. The log generating unit 520 is not restricted to directly obtaining communication data from the onboard network, and may indirectly obtain communication data from the onboard network via other devices. For example, the log generating unit 520 may obtain communication data from the onboard network via memory where the communication data is stored. The log generating unit 520 may be included in the security ECU 440.

The output unit 442 may output a sampling log transmission instruction to periodically transmit sampling logs generated by the log generating unit 520 from the transmitting unit 530 to the server device 300. The output unit 442 also may output a full log transmission instruction for the transmitting unit 530 to transmit a full log generated by the log generating unit 520 from the transmitting unit 530 to the server device 300 in a case where abnormality detection results indicating that an abnormality is included in the communication data have been obtained.

The output unit 442 may also output a change instruction to cause the log generating unit 520 to change the first time duration relating to sampling intervals within a range of being longer than the second time duration relating to sampling periods.

For example, in a case where abnormality detection results indicating that an abnormality is included in the communication data have been obtained, the output unit 442 may output a change instruction to the log generating unit 520, to shorten the first time duration within a range of being longer than the second time duration. In a case where abnormality detection results indicating that an abnormality is included in the communication data have not been obtained, the output unit 442 may output a change instruction to the log generating unit 520, to lengthen the first time duration.

Also, the first time duration may be set for each of the multiple types relating to communication data, for example. In a case where abnormality detection results indicating that an abnormality is included in communication data regarding one type have been obtained, the output unit 442 may output a change instruction to the log generating unit 520, to shorten the first time duration regarding that type within a range of being longer than the second time duration.

Alternatively, in a case where abnormality detection results indicating that an abnormality is included in communication data regarding one type have been obtained, the output unit 442 may output a change instruction to the log generating unit 520, to shorten the first time duration within a range of being longer than the second time duration, with regard to each of the multiple types. That is to say, in this case, the output unit 442 may output a change instruction to the log generating unit 520, to shorten the first time duration within a range of being longer than the second time duration, for all types.

In a case where abnormality detection results indicating that an abnormality is included in the communication data have not been obtained, the output unit 442 may output a change instruction to the log generating unit 520, to lengthen the first time duration that had been shortened.

Also, the output unit 442 may, for example, output a change instruction to the log generating unit 520, to randomly change the first time duration within a range of being longer than the second time duration. The output unit 442 may also output a change instruction to the log generating unit 520, to linearly change the first time duration within a range of being longer than the second time duration.

The obtaining unit 441 may, for example, obtain a change instruction regarding the first time duration from the server device 300, as an external instruction. The output unit 442 may output a change instruction to the log generating unit 520, to change the first time duration within a range of being longer than the second time duration, in accordance with the external instruction obtained from the server device 300. The output unit 442 may also output identifying information that causes the log generating unit 520 to identify one or more types relating to a sampling log.

The abnormality detection unit 510 may be included in the server device 300. The obtaining unit 441 may obtain abnormality detection results from the abnormality detection unit 510 included in the server device 300.

The abnormality detection unit 510 may be included in the security ECU 440. The abnormality detection unit 510 may obtain communication data from the onboard network, and determine whether or not an abnormality is included in the communication data. The abnormality detection unit 510 is not restricted to directly obtaining communication data from the onboard network, and may indirectly obtain communication data from the onboard network via another device. For example, the abnormality detection unit 510 may obtain full logs or the like generated from communication data of the onboard network, as communication data, via the log generating unit 520.

Also, the transmitting unit 530 may transmit a sampling log to the server device 300 in accordance with a sampling log transmission instruction output from the output unit 442, and transmit a full log to the server device 300 in accordance with a full log transmission instruction output from the output unit 442. The transmitting unit 530 may be included in the security ECU 440.

The transmitting unit 530 may reversibly compress a sampling log in accordance with a sampling log transmission instruction output from the output unit 442, and transmit the compressed sampling log to the server device 300. The transmitting unit 530 may also reversibly compress a full log in accordance with a full log transmission instruction output from the output unit 442, and transmit the compressed full log to the server device 300.

The output unit 442 may cause the transmitting unit 530 to periodically transmit sampling logs to the server device 300 by periodically outputting sampling log transmission instructions to cause the transmitting unit 530 to periodically transmit sampling logs to the server device 300. Alternatively, the output unit 442 may cause the transmitting unit 530 to periodically transmit sampling logs to the server device 300 by outputting a sampling log transmission instruction as a single instruction to cause the transmitting unit 530 to periodically transmit sampling logs to the server device 300.

In a case where determination is made that an abnormality is included in communication data, for example, the abnormality detection unit 510 may transmit abnormality detection results indicating that an abnormality is included in communication data, and the obtaining unit 441 may obtain the transmitted abnormality detection results. In a case where determination is made that an abnormality is not included in communication data, the abnormality detection unit 510 does not have to transmit abnormality detection results, and the obtaining unit 441 does not have to obtain abnormality detection results. Alternatively, in this case, the abnormality detection unit 510 may transmit abnormality detection results indicating that no abnormality is included in the communication data, and the obtaining unit 441 may obtain the transmitted abnormality detection results.

Note that the obtaining unit 441 and output unit 442 may be dedicated or general-purpose electric circuits. The security ECU 440, abnormality detection unit 510, log generating unit 520, transmitting unit 530, and server device 300 may be configured of electric circuits. Specifically, these may each be computers.

Also, as described above, the abnormality detection unit 510, log generating unit 520, and transmitting unit 530 may each be included in the security ECU 440. The obtaining unit 441 may obtain information from a device within the security ECU 440, and the output unit 442 may output information to a device within the security ECU 440.

Also, the abnormality detection unit 510, log generating unit 520, and transmitting unit 530 may each be an ECU connected to the onboard network. The transmitting unit 530 may be a device corresponding to the telematics communication unit 422, V2X module 423, gateway device 430, or the like, illustrated in FIG. 1. The obtaining unit 441 may obtain information from a device outside of the security ECU 440 via the onboard network, and the output unit 442 may output information to a device outside of the security ECU 440 via the onboard network.

Further, the obtaining unit 441 may obtain information from a device outside of the security ECU 440 via a network that is different from the onboard network. The output unit 442 may output information to a device outside of the security ECU 440 via a network that is different from the onboard network.

Figure 8:
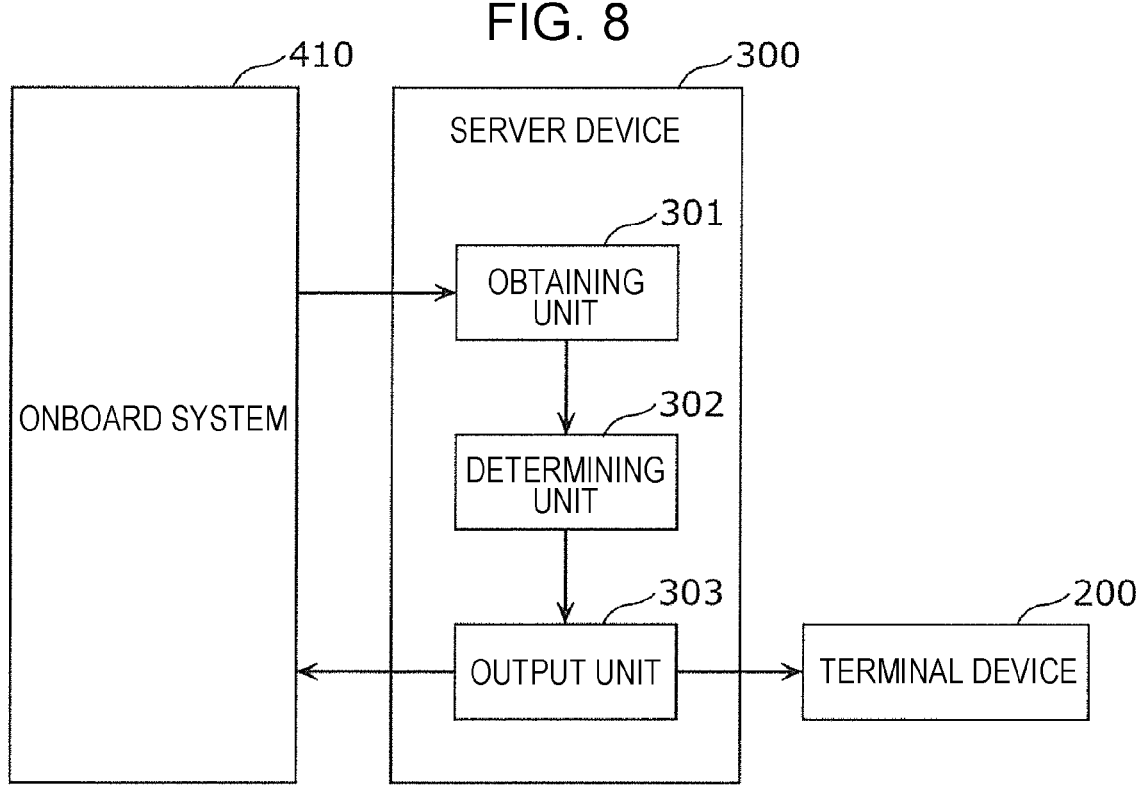
FIG. 8 is a block diagram illustrating a basic configuration of a server device according to the embodiment.

FIG. 8 is a block diagram illustrating the basic configuration of the server device 300 according to the present embodiment. The server device 300 is an example of an information processing device provided outside of the vehicle 400. The server device 300 includes an obtaining unit 301, a determining unit 302, and an output unit 303.

The obtaining unit 301 obtains information. Specifically, the obtaining unit 301 obtains sampling logs from the onboard system 410 of the vehicle 400.

The determining unit 302 performs determining processing. Specifically, the determining unit 302 determines whether or not an abnormality is included in communication data, using sampling logs.

The output unit 303 outputs information. Specifically, in a case where determination is made that an abnormality is included in communication data, the output unit 303 outputs abnormality detection results indicating that an abnormality is included in communication data to the inboard system 410, as a transmission instruction to cause a full log to be transmitted from the onboard system 410 to the server device 300.

As described above, a sampling log is a log that, out of two types of logs of communication data on the onboard network of the vehicle 400, has a smaller data amount generated per unit time than the other log. A full log is a log that, out of two types of logs, has a greater data amount generated per unit time than the other log.

Also, for example, a full log may be a log of multiple types of communication data. A sampling log may be a log of communication data of at least one or more type but less than the multiple types relating to the full log.

A sampling log may be a log of communication data in, out of multiple sampling intervals, multiple sampling periods included in each of multiple sampling intervals. Note that each of multiple sampling intervals is a period of a first time duration. Each of multiple sampling periods is a second time duration that is shorter than the first time duration.

The output unit 303 may also output, to the onboard system 410 that generates sampling logs as described above, a change instruction to cause the onboard system 410 to change the first time duration within a range of being longer than the second time duration. For example, in a case where determination is made that that an abnormality is included in the communication data, the output unit 303 may output a change instruction to cause the onboard system 410 to shorten the first time duration within a range of being longer than the second time duration. In a case where determination has been made that an abnormality is not included in the communication data, the output unit 303 may output a change instruction to cause the onboard system 410 to lengthen the first time duration.

Also, the first time duration may be set for each of the multiple types relating to communication data, for example. In a case where determination is made that that an abnormality is included in the communication data regarding one type, the output unit 303 may output a change instruction to cause the onboard system 410 to shorten the first time duration for that type within a range of being longer than the second time duration.

Alternatively, in a case where determination is made that that an abnormality is included in the communication data regarding one type, the output unit 303 may output a change instruction to cause the onboard system 410 to shorten the first time duration within a range of being longer than the second time duration, with regard to each of the multiple types. That is to say, in this case, the output unit 303 may output a change instruction to cause the onboard system 410 to shorten the first time duration within a range of being longer than the second time duration, for all types.

In a case where determination is made that that an abnormality is not included in the communication data, the output unit 303 may output a change instruction to cause the onboard system 410 to lengthen the first time duration that had been shortened.

Further, the output unit 303 may output a change instruction such as described above to multiple onboard systems of multiple vehicles of the same vehicle type as the vehicle 400. The output unit 303 may also output a change instruction to multiple onboard systems of multiple vehicles in the same region as the vehicle 400.

A sampling log may indicate, with regard to each frame making up communication data in multiple sampling periods, (i) sampling time of the frame, (ii) whether or not the frame is a first frame, and (iii) data of the frame. Whether or not the frame is the first frame is whether or not the frame is the first frame out of one or more frames having the same sampling period as the frame, for example.

In a case where the frame is not the first frame, out of one or more frames having the same sampling period as the frame., the determining unit 302 may determine whether or not an abnormality is included in the communication data, using at least one of difference in sampling time and difference in data.

Now, difference in sampling time is difference between the sampling time of the frame and the sampling time of a frame before the frame, out of one or more frames of which the sampling period is the same as the frame. Difference in data is difference between the data of such a frame before, and data of the frame. A frame before is, for example, a frame immediately prior.

Also, a sampling log may indicate, with regard to each frame making up communication data of one or more types in multiple sampling periods, (i) sampling time of the frame, (ii) whether or not the frame is a first frame, and (iii) data of the frame. Whether or not the frame is the first frame is whether or not the frame is the first frame out of one or more frames having the same type and sampling period as the frame, for example.

In a case where the frame is not the first frame, out of one or more frames having the same type and sampling period as the frame, the determining unit 302 may determine whether or not an abnormality is included in the communication data, using at least one of difference in sampling time and difference in data.

Now, difference in sampling time is difference between the sampling time of the frame and the sampling time of a frame before the frame, out of one or more frames having the same type and sampling period as the frame. Difference in data is difference between the data of such a frame before, and data of the frame.

The obtaining unit 301 may obtain a full log from the onboard system 410 after having output a transmission instruction. The determining unit 302 may further determine whether or not an abnormality is included in the communication data, using the full log.

In a case where determination is made that an abnormality is included in the communication data using the sampling log, the output unit 303 may output abnormality detection results to the onboard system 410. In a case where determination is made that an abnormality is included in communication data, the output unit 303 does not have to output abnormality detection results to the onboard system 410. That is to say, in a case where determination is made that an abnormality is included in the communication data in a state where a full log has not been obtained, the output unit 303 may output abnormality detection results to the onboard system 410.

Also, in a case where determination is made that an abnormality is included in the communication data, the output unit 303 may output abnormality detection results to the terminal device 200.

The obtaining unit 301 may obtain from the onboard system 410 a sampling log that has been compressed at the onboard system 410, and decompress the compressed sampling log. In the same way, the obtaining unit 301 may obtain from the onboard system 410 a full log that has been compressed at the onboard system 410, and decompress the compressed full log.

Note that the obtaining unit 301, determining unit 302, and output unit 303 may be dedicated or general-purpose electric circuits. The terminal device 200, server device 300, and onboard system 410 may be configured of electric circuits. Specifically, these may each be computers. The obtaining unit 301 may obtain information from a device outside of the server device 300 via an external network, and the output unit 303 may output information to a device outside of the server device 300 via an external network.

The average data amount of a sampling log generated per unit time is smaller than the average data amount of a full log generated per unit time. The unit time may be one second, or may be one minute, or may be one hour, or may be a sampling interval relating to the sampling log.

Specific Example

Figure 9:
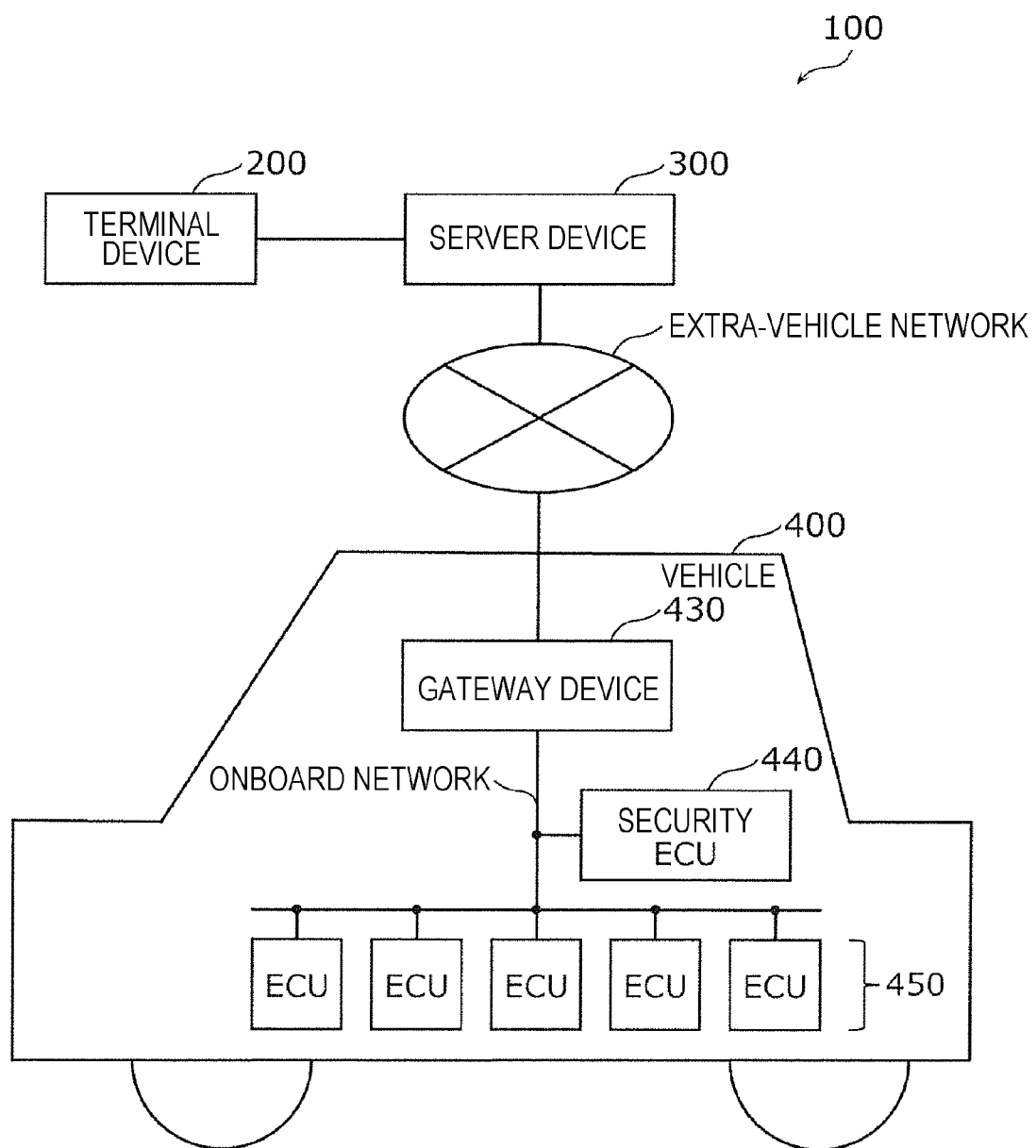
FIG. 9 is a block diagram illustrating a configuration of the security system in a specific example.

FIG. 9 is a block diagram illustrating the configuration of the security system 100 according to a specific example of the present embodiment. In this specific example, the security system 100 has the terminal device 200, server device 300, gateway device 430, security ECU 440, and multiple ECUs 450. The security system 100 has the terminal device 200, server device 300, gateway device 430, and security ECU 440 illustrated in FIG. 9 each correspond to the components illustrated in FIG. 1. The multiple ECUs 450 illustrated in FIG. 9 correspond to the multiple ECUs 451 and 452 illustrated in FIG. 1.

The gateway device 430, security ECU 440, and multiple ECUs 450 are connected to an onboard network. The server device 300 is connected to the terminal device 200 and an external network. The server device 300 may be connected to the terminal device 200 via the external network. The external network and onboard network are connected to each other via the gateway device 430. The gateway device 430 relays communication between the onboard network and the external network.

For example, the gateway device 430 is wirelessly connected to the external network. The gateway device 430 may be connected to the external network via the telematics communication unit 422 or V2X module 423 illustrated in FIG. 1, or the like. The external network may be a wireless communication network, or may be a wired communication network.

The security ECU 440, server device 300, and terminal device 200 have a role of protecting the vehicle 400, onboard network, and so forth, from unauthorized access. The security ECU 440 directly monitors communication data on the onboard network. The server device 300 performs remote monitoring by indirectly monitoring communication data on the onboard network. The terminal device 200 obtains the results of remote monitoring from the server device 300. The terminal device 200 is used by a monitoring organization such as a SOC, ASIRT, or the like.

Figure 10:
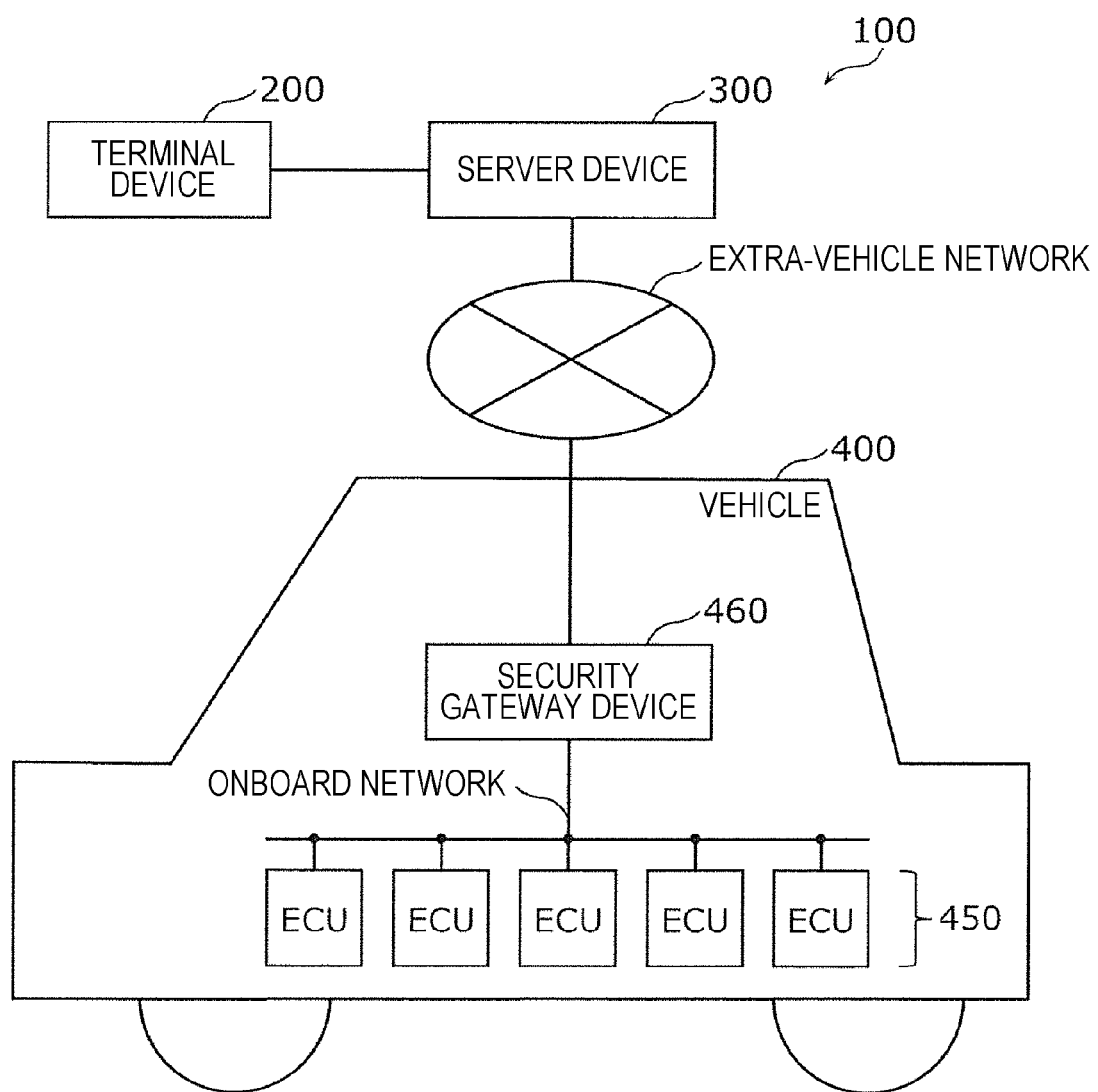
FIG. 10 is a block diagram illustrating a modified configuration of the security system in a specific example.

FIG. 10 is a block diagram illustrating a modified configuration of the security system 100 illustrated in FIG. 9. In this modified configuration, the gateway device 430 and security ECU 440 in FIG. 9 are integrated. The security system 100 has a security gateway device 460, where the gateway device 430 and security ECU 440 have been integrated. Note that the security gateway device 460 may be the security ECU 440 including the gateway device 430, or may be the gateway device 430 including the security ECU 440.

Figure 11:
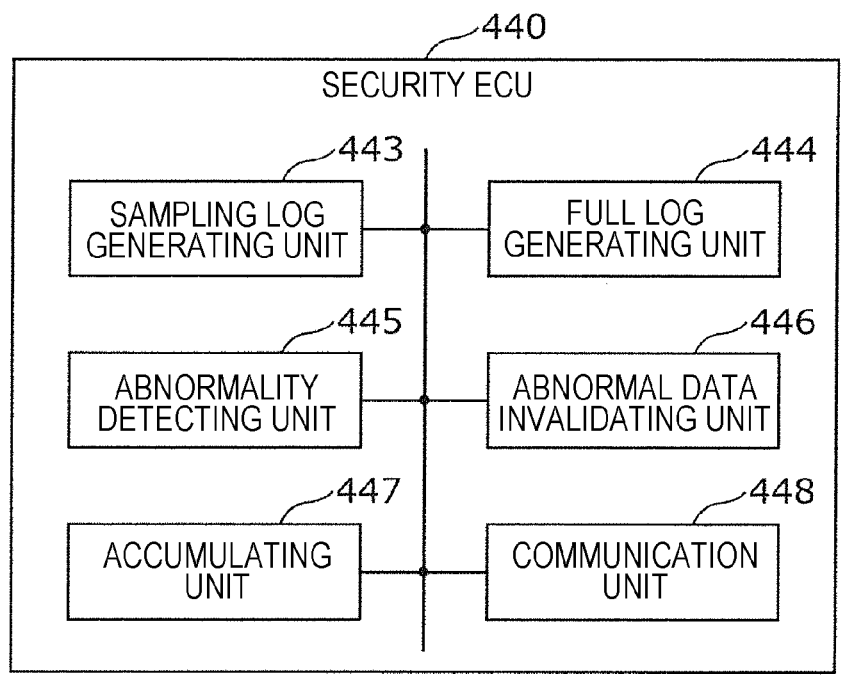
FIG. 11 is a block diagram illustrating a configuration of the security ECU in a specific example.

FIG. 11 is a block diagram illustrating the configuration of the security ECU 440 illustrated in FIG. 9. The security ECU 440 includes a sampling log generating unit 443, a full log generating unit 444, an abnormality detecting unit 445, an abnormal data invalidating unit 446, an accumulating unit 447, and a communication unit 448. These components serve the roles of the obtaining unit 441, output unit 442, abnormality detection unit 510, log generating unit 520, and transmitting unit 530, illustrated in FIG. 7, and so forth.

The sampling log generating unit 443 obtains communication data on the onboard network via the communication unit 448, generates sampling logs of the obtained communication data, and stores the generated sampling logs in the accumulating unit 447.

The full log generating unit 444 obtains communication data on the onboard network via the communication unit 448, generates full logs of the obtained communication data, and stores the generated full logs in the accumulating unit 447.

The abnormality detecting unit 445 obtains communication data on the onboard network via the communication unit 448, and determines whether or not an abnormality is included in the obtained communication data. The abnormality detecting unit 445 may determine whether or not an abnormality is included in the communication data by determining whether or not an abnormality is included in the full logs stored in the accumulating unit 447. Alternatively, the abnormality detecting unit 445 may determine in a simplified manner whether or not an abnormality is included in the communication data by determining whether or not an abnormality is included in the sampling logs stored in the accumulating unit 447.

The abnormal data invalidating unit 446 invalidates abnormal communication data a case where determination is made that an abnormality is included in the communication data. Specifically, the abnormal data invalidating unit 446 may invalidate abnormal communication data by outputting a CAN error frame to the onboard network via the communication unit 448.

The accumulating unit 447 accumulates sampling logs generated by the sampling log generating unit 443 and full logs generated by the full log generating unit 444. The accumulating unit 447 is configured of memory, for example.

The communication unit 448 obtains information from the onboard network, and outputs information to the onboard network, thereby communicating with the multiple ECUs 450, the gateway device 430, and so forth. The communication unit 448 may further communicate with the server device 300 and so forth via the gateway device 430.

The obtaining unit 441, output unit 442, and transmitting unit 530 illustrated in FIG. 7 may be included in the communication unit 448. The abnormality detection unit 510 illustrated in FIG. 7 may be included in the abnormality detecting unit 445. The log generating unit 520 illustrated in FIG. 7 may be made up of the sampling log generating unit 443, full log generating unit 444, and accumulating unit 447.

For example, the output unit 442 may output a transmission instruction to the transmitting unit 530 to periodically transmit sampling logs, at the communication unit 448. The obtaining unit 441 included in the communication unit 448 may obtain abnormality detection results regarding whether or not an abnormality is included in the communication data from the abnormality detecting unit 445. In a case where abnormality detection results indicating that an abnormality is included in the communication data has been obtained, the output unit 442 may output a transmission instruction to the transmitting unit 530 to transmit a full log, at the communication unit 448.

Also, for example, the output unit 442 included in the communication unit 448 may output an instruction relating to the sampling interval or type to the sampling log generating unit 443 making up the log generating unit 520.

The above-described relations between the components illustrated in FIG. 7 and the components illustrated in FIG. 11 is exemplary, and these relations are not restricted to the above example. For example, the obtaining unit 441 and output unit 442 illustrated in FIG. 7 may be included in the abnormality detecting unit 445. At the abnormality detecting unit 445, the obtaining unit 441 may obtain abnormality detection results regarding whether or not an abnormality is included in the communication data, from the abnormality detection unit 510 that determines whether or not an abnormality is included in the communication data.

Figure 12:
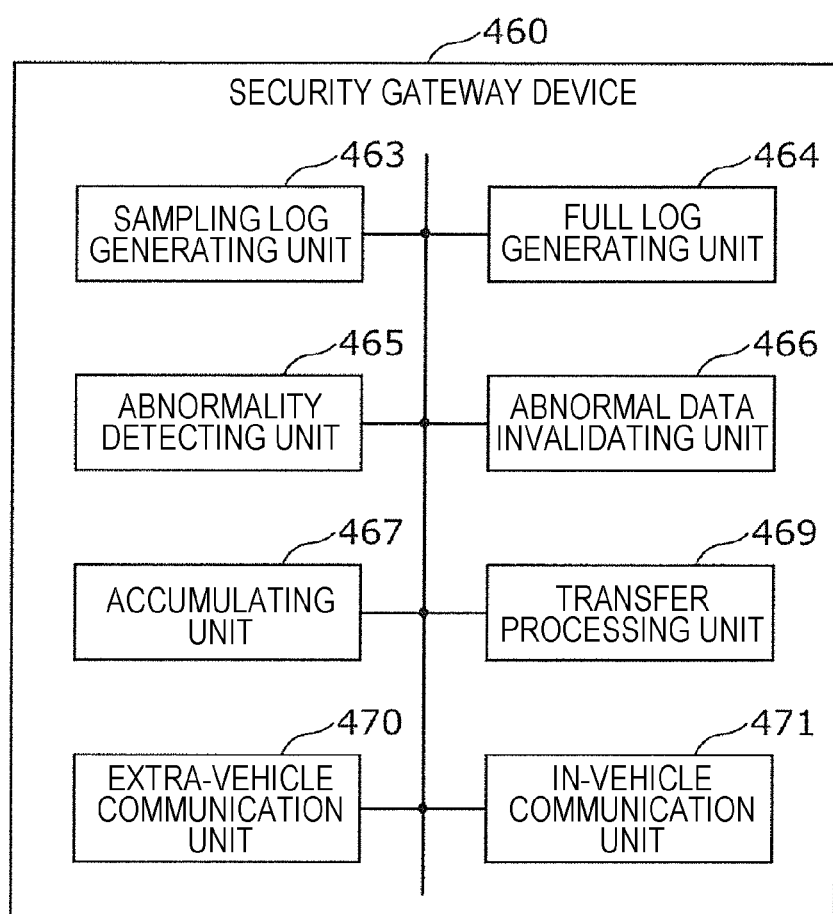
FIG. 12 is a block diagram illustrating a configuration of a security gateway device in a specific example.

FIG. 12 is a block diagram illustrating the configuration of the security gateway device 460 illustrated in FIG. 10. The security gateway device 460 includes a sampling log generating unit 463, a full log generating unit 464, an abnormality detecting unit 465, an abnormal data invalidating unit 466, an accumulating unit 467, a transfer processing unit 469, an extra-vehicle communication unit 470, and an in-vehicle communication unit 471. These components serve the roles of the obtaining unit 441, output unit 442, abnormality detection unit 510, log generating unit 520, and transmitting unit 530, illustrated in FIG. 7, and so forth.

The sampling log generating unit 463, full log generating unit 464, abnormality detecting unit 465, abnormal data invalidating unit 466, and accumulating unit 467 in FIG. 12 are components the same as the sampling log generating unit 443, full log generating unit 444, abnormality detecting unit 445, abnormal data invalidating unit 446, and accumulating unit 447 in FIG. 11.

The transfer processing unit 469 transfers information from outside of the vehicle 400 to inside, by obtaining information from outside of the vehicle 400 via the extra-vehicle communication unit 470, and outputting information via the in-vehicle communication unit 471. The transfer processing unit 469 also externally transfers information from inside of the vehicle 400 by obtaining information from inside the vehicle 400 via the in-vehicle communication unit 471 and externally outputting the information via the extra-vehicle communication unit 470 to outside of the vehicle 400.

The extra-vehicle communication unit 470 communicates with the server device 300 and so forth outside of the vehicle 400 via an external network, for example. the in-vehicle communication unit 471 communicates with the multiple ECUs 450 and so forth within the vehicle 400 via the onboard network. The extra-vehicle communication unit 470 and in-vehicle communication unit 471 serve the same roles as the communication unit 448 of the security ECU 440.

The operations of the security ECU 440 that will be described below may be performed by the security gateway device 460 as well. For example, operations performed by the communication unit 448 of the security ECU 440 may be performed by the extra-vehicle communication unit 470 or in-vehicle communication unit 471 of the security gateway device 460.

Also, the obtaining unit 441, output unit 442, and transmitting unit 530 illustrated in FIG. 7 may be included in the extra-vehicle communication unit 470, as one example. The abnormality detection unit 510 illustrated in FIG. 7 may be included in the abnormality detecting unit 465. The log generating unit 520 illustrated in FIG. 7 may be made up of the sampling log generating unit 463, full log generating unit 464, and accumulating unit 467.

Figure 13:
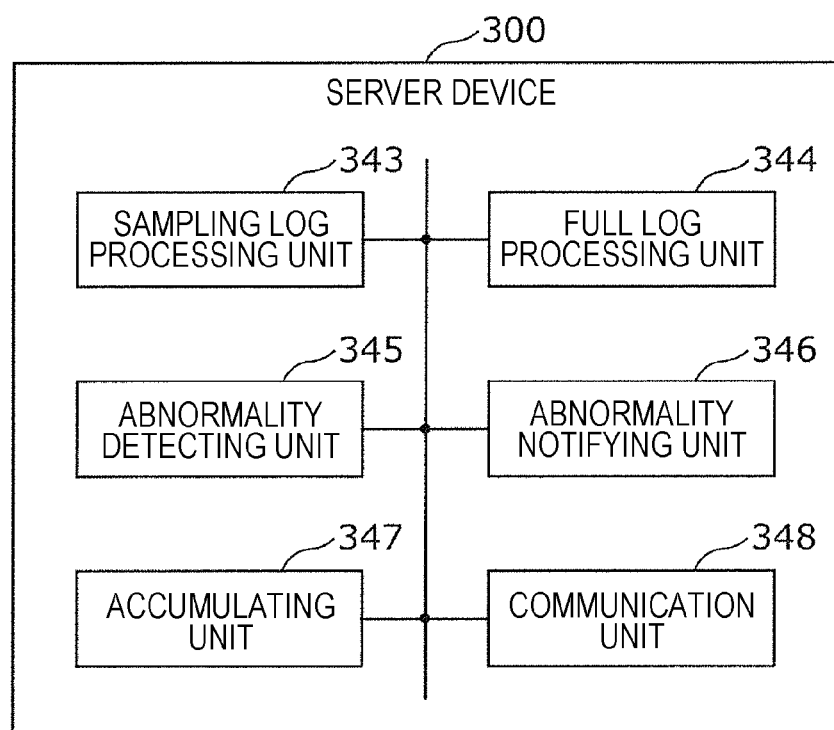
FIG. 13 is a block diagram illustrating a configuration of the server device in a specific example.

FIG. 13 is a block diagram illustrating the configuration of the server device 300 illustrated in FIG. 9 and so forth. The server device 300 includes a sampling log processing unit 343, a full log processing unit 344, an abnormality detecting unit 345, an abnormality notifying unit 346, an accumulating unit 347, and a communication unit 348. These components serve the role of the obtaining unit 301, determining unit 302, and output unit 303 illustrated in FIG. 8, and so forth.

The sampling log processing unit 343 obtains sampling logs via the communication unit 348, and stores the obtained sampling logs in the accumulating unit 347. The full log processing unit 344 obtains full logs via the communication unit 348, and stores the obtained full logs in the accumulating unit 347.

The abnormality detecting unit 345 determines whether or not there is an abnormality included in the communication data by determining whether or not there is an abnormality included in a sampling log or full log stored in the accumulating unit 347.

In a case where determination is made that an abnormality is included in the communication data, the abnormality notifying unit 346 transmits an abnormality notification to the terminal device 200 and security ECU 440 via the communication unit 348.

The accumulating unit 347 accumulates sampling logs obtained by the sampling log processing unit 343 and full logs obtained by the full log processing unit 344. The accumulating unit 347 is configured of memory, for example.

The communication unit 348 communicates with the security ECU 440 and so forth, via an external network, for example. The communication unit 348 also communicates with the terminal device 200.

Note that the obtaining unit 301 and output unit 303 illustrated in FIG. 8 may be included in the communication unit 348, as one example. The determining unit 302 illustrated in FIG. 8 may be included in the abnormality detecting unit 345.

Figure 14:
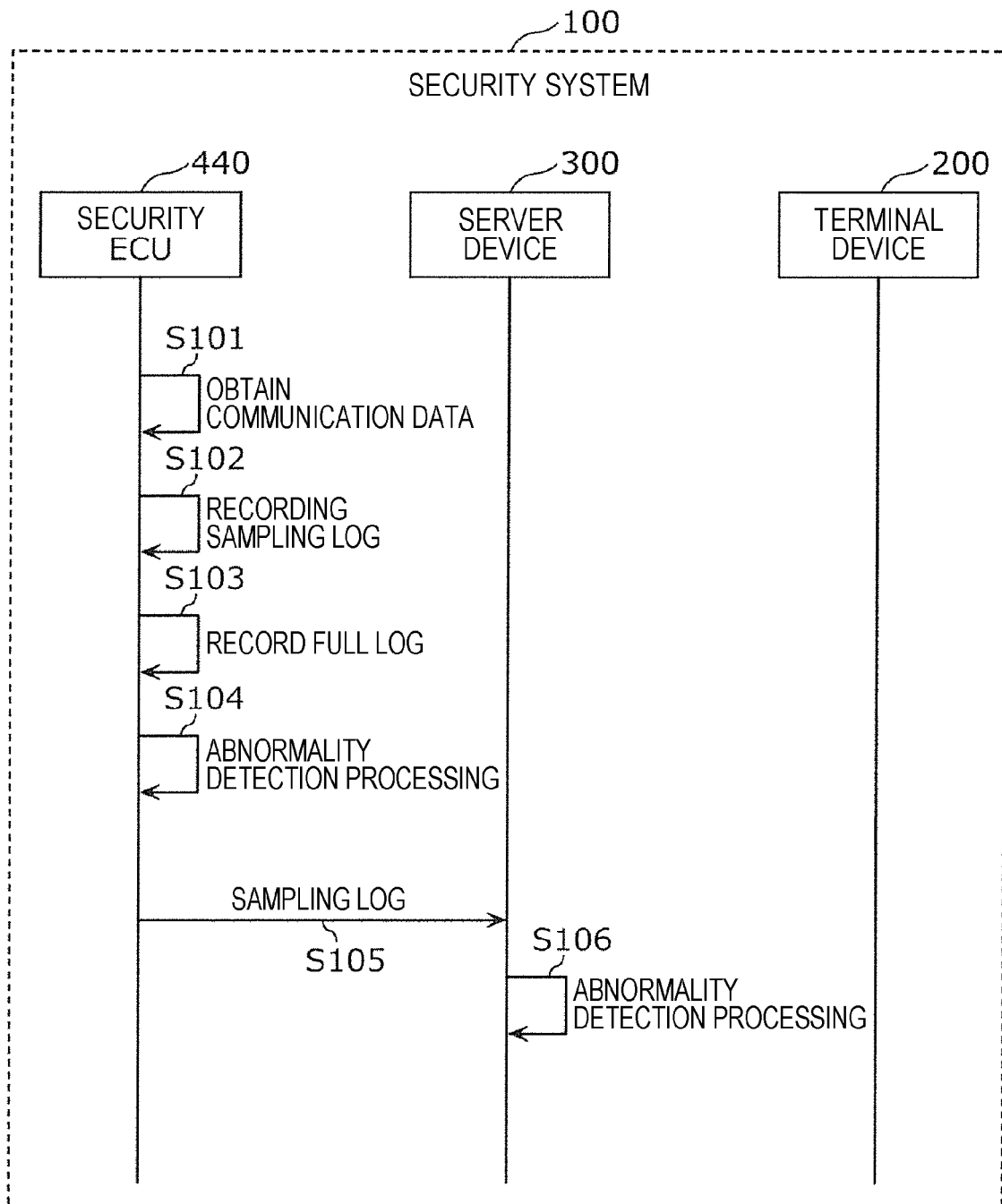
FIG. 14 is a sequence diagram illustrating operations relating to transmission of a sampling log in a specific example.

FIG. 14 is a sequence diagram illustrating operations relating to transmission of a sampling log in the security system 100 illustrated in FIG. 9.

First, the communication unit 448 of the security ECU 440 obtains communication data from the onboard network (S101). Next, the sampling log generating unit 443 of the security ECU 440 records sampling logs in the accumulating unit 447 in accordance with the communication data obtained from the onboard network (S102). The full log generating unit 444 of the security ECU 440 also records full logs in the accumulating unit 447 in accordance with the communication data obtained from the onboard network (S103).

The abnormality detecting unit 445 of the security ECU 440 performs abnormality detection processing in accordance with communication data obtained from the onboard network (S104). That is to say, the abnormality detecting unit 445 of the security ECU 440 determines whether or not there is an abnormality included in the communication data obtained from the onboard network.

In a case where no abnormality is detected, i.e., in a case where determination has been made that there is no abnormality included in the communication data obtained from the onboard network, the communication unit 448 of the security ECU 440 periodically transmits sampling logs (S105). For example, the communication unit 448 of the security ECU 440 compresses sampling logs recorded in the accumulating unit 447, and transmits the compressed sampling logs to the server device 300.

The communication unit 348 of the server device 300 obtains sampling logs from the security ECU 440. The sampling log processing unit 343 of the server device 300 records sampling logs obtained from the security ECU 440 in the accumulating unit 347. For example, the sampling log processing unit 343 of the server device 300 decompresses the compressed sampling logs, and records the decompressed sampling logs in the accumulating unit 347.

The abnormality detecting unit 345 of the server device 300 performs abnormality detection processing in accordance with the sampling logs recorded in the accumulating unit 347 (S106). That is to say, the abnormality detecting unit 345 of the server device 300 determines whether or not there is an abnormality included in the communication data on the onboard network by determining whether or not there is an abnormality included in the sampling logs.

Figure 15:
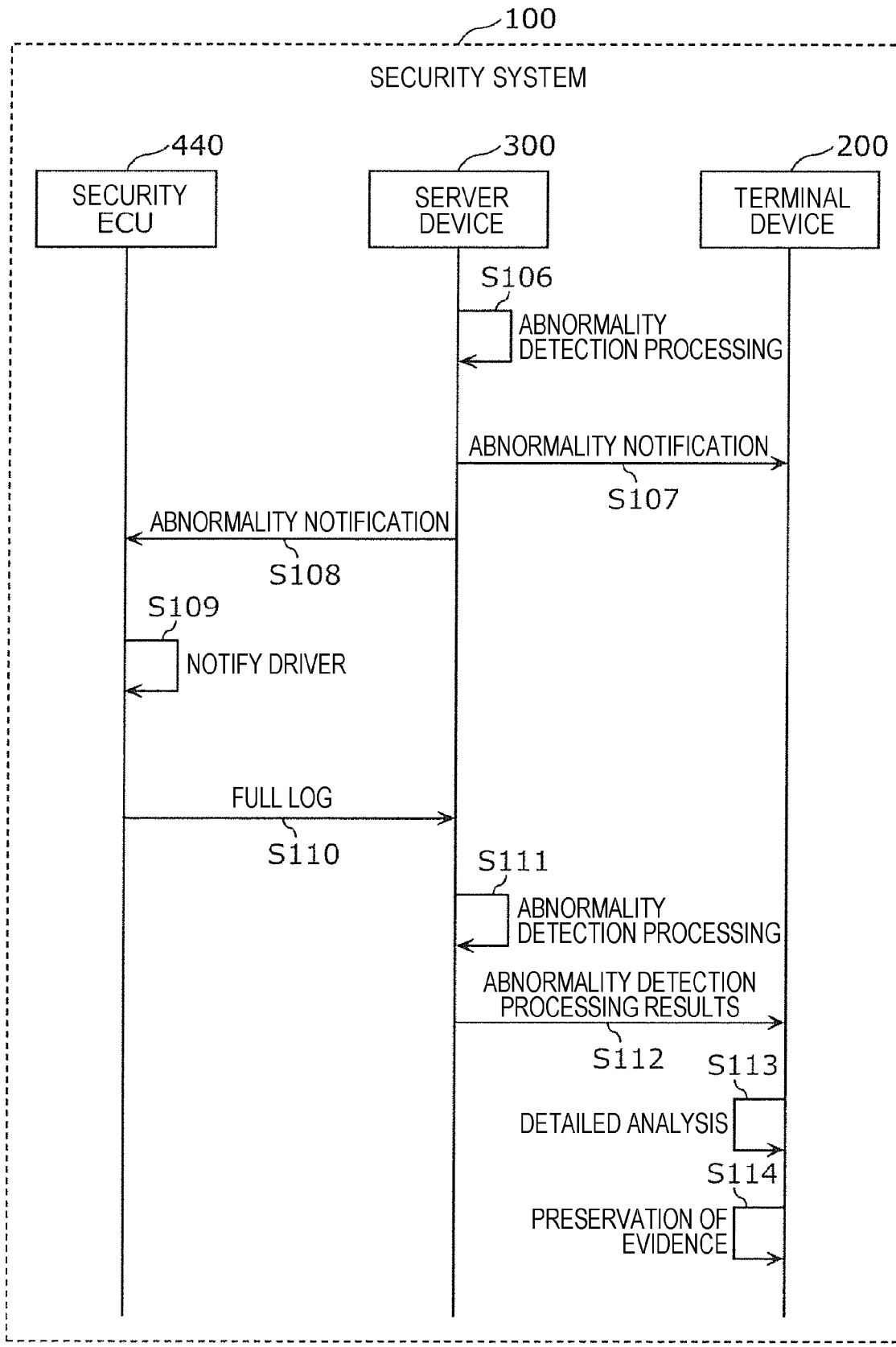
FIG. 15 is a sequence diagram illustrating operations relating to abnormality detection processing carried out at the server device in a specific example.

FIG. 15 is a sequence diagram illustrating operations relating to abnormality detection processing performed at the server device 300 illustrated in FIG. 9 and so forth.

In a case where an abnormality has been detected in the abnormality detection processing performed at the server device 300 (S106), the abnormality notifying unit 346 of the server device 300 transmits an abnormality notification via the communication unit 348. That is to say, in a case where determination has been made that there is an abnormality included in the communication data on the onboard network in accordance with the sampling logs, the abnormality notifying unit 346 of the server device 300 transmits an abnormality notification via the communication unit 348.

For example, the abnormality notifying unit 346 of the server device 300 transmits an abnormality notification to the terminal device 200 via the communication unit 348 (S107). The terminal device 200 obtains the abnormality notification from the server device 300, and notifies the monitoring organization of the abnormality.

The abnormality notifying unit 346 of the server device 300 also transmits an abnormality notification to the security ECU 440 via the communication unit 348 (S108). The communication unit 448 of the security ECU 440 obtains the abnormality notification, and notifies the driver of the abnormality (S109).

For example, the communication unit 448 of the security ECU 440 notifies the driver of the abnormality via a notification interface, by outputting the abnormality notification to an ECU 450 having a notification interface such as a display, speaker, or the like. Alternatively, in a case where the security ECU 440 has a notification interface, the security ECU 440 may notify the driver of the abnormality via the notification interface of the security ECU 440.

Also, in a case of having obtained an abnormality notification, the communication unit 448 of the security ECU 440 transmits a full log to the server device 300 (S110). For example, the communication unit 448 of the security ECU 440 compresses the full log recorded in the accumulating unit 447 and transmits the compressed full log to the server device 300.

The communication unit 348 of the server device 300 then obtains the full log from the security ECU 440. The full log processing unit 344 of the server device 300 records the full log obtained from the security ECU 440 in the accumulating unit 347. For example, the full log processing unit 344 of the server device 300 decompresses the compressed full log, and records the decompressed full log in the accumulating unit 347.

The abnormality detecting unit 345 of the server device 300 then performs abnormality detection processing in accordance with the full log recorded in the accumulating unit 347 (S111). That is to say, the abnormality detecting unit 345 of the server device 300 determines whether or not there is an abnormality included in the communication data on the onboard network by determining whether or not there is an abnormality included in the full log.

The communication unit 348 of the server device 300 transmits the results of abnormality detection processing to the terminal device 200 (S112). The abnormality notifying unit 346 of the server device 300 may transmit an abnormality notification as the results of abnormality detection processing to the terminal device 200 via the communication unit 348. The terminal device 200 obtains the results of the abnormality detection processing from the server device 300, and notifies the monitoring organization of the results of the abnormality detection processing.

The terminal device 200 then is operated by the monitoring organization to perform detailed analysis relating to the abnormality (S113). The terminal device 200 also is operated by the monitoring organization to preserve evidence (S114). The terminal device 200 may download the full log from the server device 300 for detailed analysis and preservation of evidence.

Figure 16:
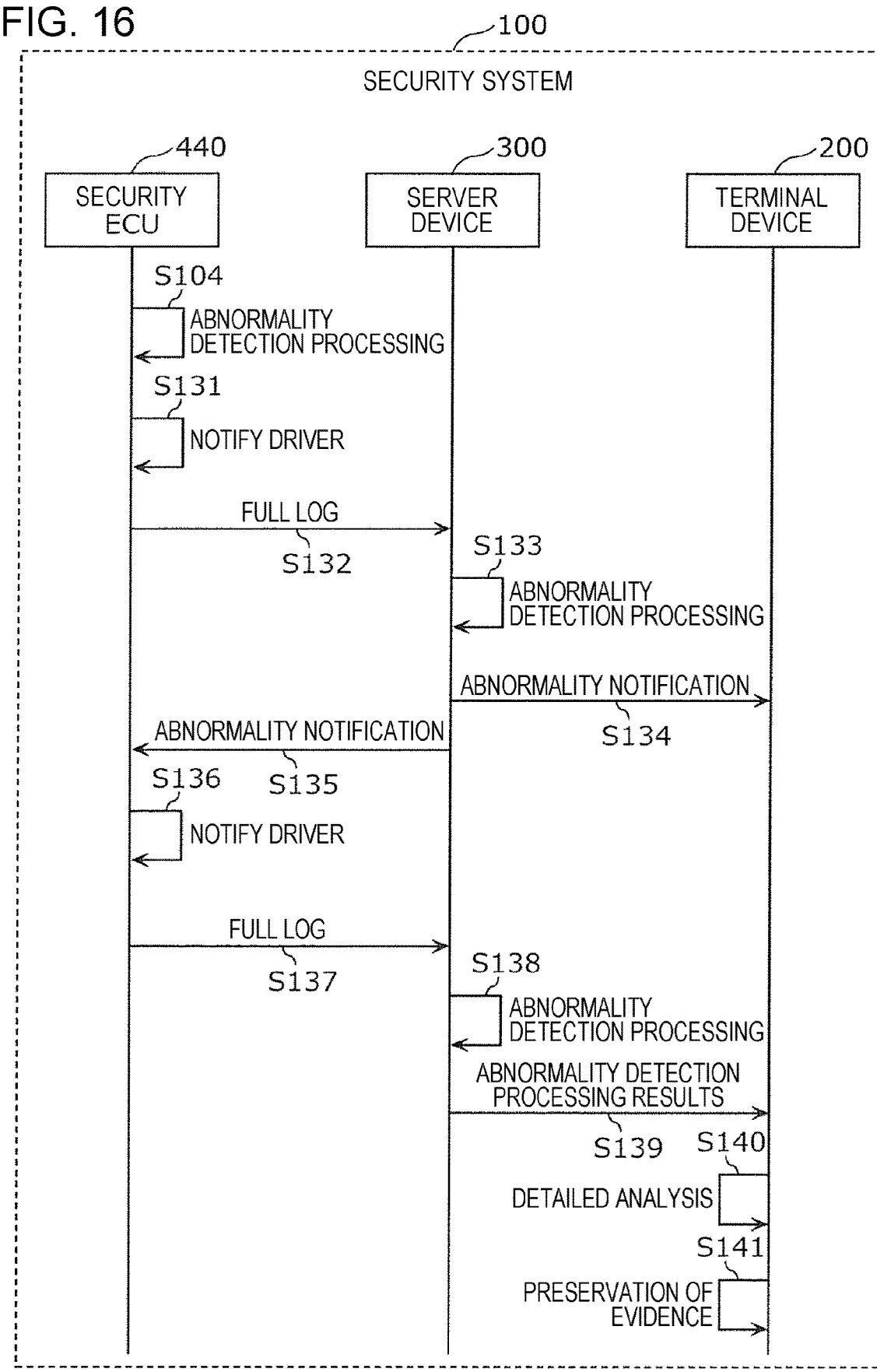
FIG. 16 is a sequence diagram illustrating operations relating to abnormality detection processing carried out at the security ECU in a specific example.

FIG. 16 is a sequence diagram illustrating operations relating to abnormality detection processing performed at the security ECU 440 illustrated in FIG. 9 and so forth.

In a case where an abnormality is detected in the abnormality detection processing performed by the security ECU 440 (S104), the communication unit 448 of the security ECU 440 notifies the driver of the abnormality (S131). That is too say, in a case where determination is made that an abnormality is included in the communication data obtained from the onboard network, the communication unit 448 of the security ECU 440 notifies the driver of the abnormality.

For example, the communication unit 448 of the security ECU 440 notifies the driver of the abnormality via a notification interface, by outputting the abnormality notification to an ECU 450 having a notification interface. Alternatively, in a case where the security ECU 440 has a notification interface, the security ECU 440 may notify the driver of the abnormality via the notification interface of the security ECU 440.

The communication unit 448 of the security ECU 440 then transmits the full log (S132). For example, the communication unit 448 of the security ECU 440 compresses the full log recorded in the accumulating unit 447 and transmits the compressed full log to the server device 300.

The communication unit 348 of the server device 300 then obtains the full log from the security ECU 440. The full log processing unit 344 of the server device 300 records the full log obtained from the security ECU 440 in the accumulating unit 347. For example, the full log processing unit 344 of the server device 300 decompresses the compressed full log, and records the decompressed full log in the accumulating unit 347.

The abnormality detecting unit 345 of the server device 300 then performs abnormality detection processing in accordance with the full log recorded in the accumulating unit 347 (S133). That is to say, the abnormality detecting unit 345 of the server device 300 determines whether or not there is an abnormality included in the communication data on the onboard network, by determining whether or not there is an abnormality included in the full log.

In a case where an abnormality has been detected, i.e., in a case where determination is made that an abnormality is included in the communication data on the onboard network in accordance with the full log, the abnormality notifying unit 346 of the server device 300 transmits an abnormality notification via the communication unit 348. For example, the abnormality notifying unit 346 of the server device 300 transmits an abnormality notification to the terminal device 200 via the communication unit 348 (S134). The terminal device 200 then obtains the abnormality notification from the server device 300 and notifies the monitoring organization of the abnormality.

The abnormality notifying unit 346 of the server device 300 also transmits an abnormality notification to the security ECU 440 via the communication unit 348 (S135). The communication unit 448 of the security ECU 440 then obtains the abnormality notification, and notifies the driver of the abnormality (S136). In a case of having obtained the abnormality notification, the communication unit 448 of the security ECU 440 transmits the full log to the server device 300 (S137).

The communication unit 348 of the server device 300 then obtains the full log from the security ECU 440. The full log processing unit 344 of the server device 300 records the full log obtained from the security ECU 440 in the accumulating unit 347. The abnormality detecting unit 345 of the server device 300 then performs abnormality detection processing in accordance with the full log recorded in the accumulating unit 347 (S138).

The communication unit 348 of the server device 300 transmits the results of abnormality detection processing to the terminal device 200 (S139). The abnormality notifying unit 346 of the server device 300 may transmit an abnormality notification as the results of abnormality detection processing to the terminal device 200 via the communication unit 348. The terminal device 200 obtains the results of the abnormality detection processing from the server device 300, and notifies the monitoring organization of the results of the abnormality detection processing.

The terminal device 200 then is operated by the monitoring organization to perform detailed analysis relating to the abnormality (S140). The terminal device 200 also is operated by the monitoring organization to preserve evidence (S141).

The processing from transmission of abnormality notification to the terminal device 200 (S134) up to preservation of evidence (S141) illustrated in FIG. 16 is the same as the processing from transmission of abnormality notification to the terminal device 200 (S107) up to preservation of evidence (S114) illustrated in FIG. 15. In order to avoid repetition of processing, the processing from transmission of an abnormality notification to the security ECU 440 (S135) through transmission of abnormality detection processing results to the terminal device 200 (S139) may be omitted.

Figure 17:
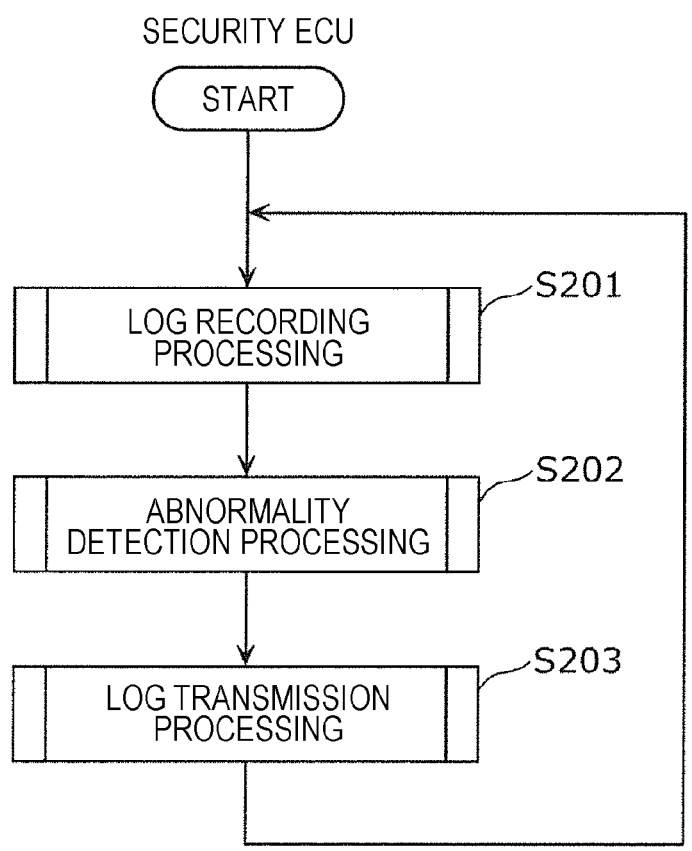
FIG. 17 is a flowchart illustrating operations of the security ECU in a specific example.

FIG. 17 is a flowchart illustrating operations of the security ECU 440 illustrated in FIG. 9 and so forth.

The security ECU 440 performs log recording processing for a recording log of communication data on the onboard network (S201). The security ECU 440 also performs abnormality detection processing to detect abnormalities in the communication data (S202). The security ECU 440 then performs log transmission processing to transmit the communication log to the server device 300 (S203). The security ECU 440 repeats this processing (S201 through S203).

Figure 18:
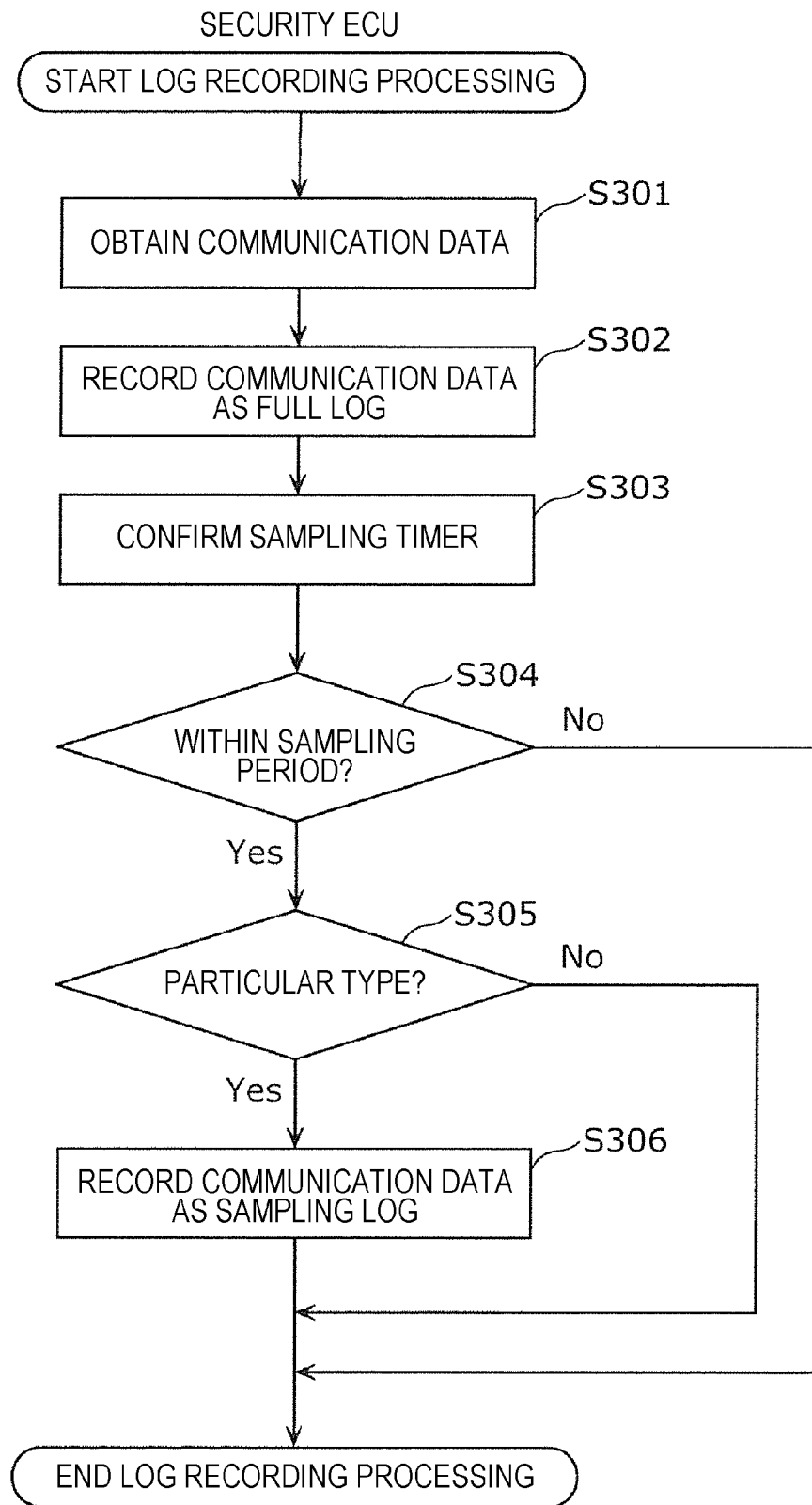
FIG. 18 is a flowchart illustrating a first form of log recording processing carried out at the security ECU in a specific example.

FIG. 18 is a flowchart illustrating a first form of log recording processing performed at the security ECU 440 illustrated in FIG. 9 and so forth.

First, the communication unit 448 obtains communication data by receiving communication data on the onboard network (S301). Specifically, the communication unit 448 obtains a CAN frame as communication data.

Next, the full log generating unit 444 records the obtained communication data in the accumulating unit 447 as a full log (S302). Specifically, the full log generating unit 444 records the obtained frame in the accumulating unit 447 as a full log, in accordance with the log format in FIG. 4. Also, in a case where frames obtained in the past are recorded in the accumulating unit 447 as full logs, the full log generating unit 444 adds information of the newly-obtained frame to the payload in the log format in FIG. 4.

Next, the sampling log generating unit 443 confirms a sampling timer at the sampling log generating unit 443 for example, thereby determining whether or not the current time is within a sampling period (S303). In a case where the current time is not within a sampling period (No in S304), the security ECU 440 ends the log recording processing.

In a case where the current time is within a sampling period (Yes in S304), the sampling log generating unit 443 determines whether or not the obtained communication data is communication data of a particular type. In doing so, specifically, the sampling log generating unit 443 determines whether or not the obtained frame is a frame of a particular type, by determining whether the ID included in the obtained frame is a particular ID or not.

In a case where determination is made that the obtained communication data is not communication data of a particular type (No in S305), the security ECU 440 ends the log recording processing.

In a case where determination is made that the obtained communication data is communication data of a particular type (Yes in S305), the sampling log generating unit 443 records the obtained communication data in the accumulating unit 447 as a sampling log (S306).

Specifically, the sampling log generating unit 443 records the obtained frame in the accumulating unit 447 as a sampling log, in accordance with the log format in FIG. 4. Also, for example, in a case where frames obtained in the past are recorded in the accumulating unit 447 as sampling logs, the sampling log generating unit 443 adds information of the newly-obtained frame to the payload in the log format in FIG. 4. The security ECU 440 then ends the log recording processing. Note that the sampling log generating unit 443 and full log generating unit 444 basically record sampling logs and full logs in the accumulating unit 447 separately.

Figure 19:
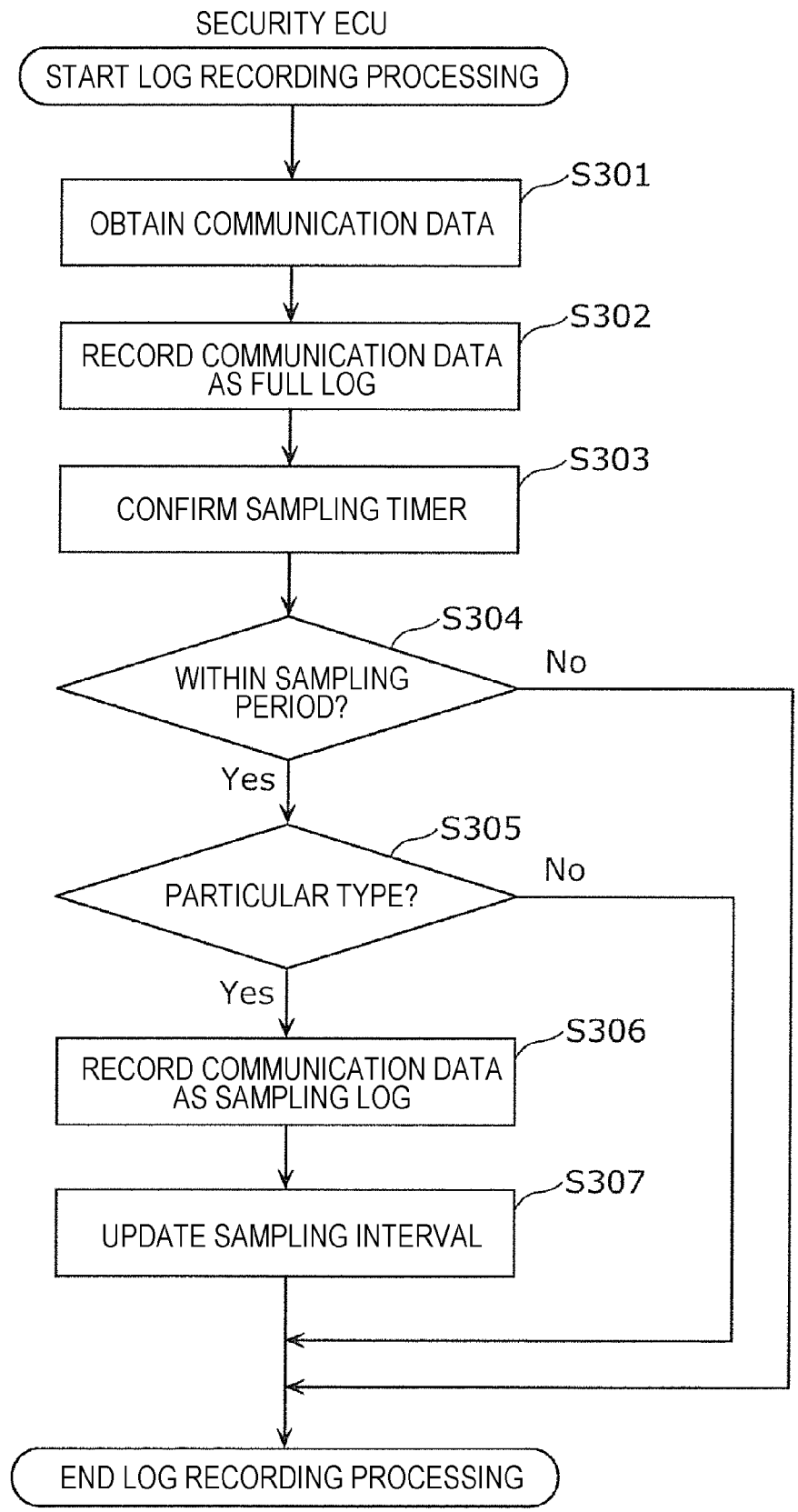
FIG. 19 is a flowchart illustrating a second form of log recording processing carried out at the security ECU in a specific example.

FIG. 19 is a flowchart illustrating a second form of log recording processing performed at the security ECU 440 illustrated in FIG. 9 and so forth. In the second form of log recording processing illustrated in FIG. 19, the processing from obtaining communication data up to recording the communication data as a sampling log (S301 through S306) is the same as the log recording processing of the first form illustrated in FIG. 18.

In the second form of log recording processing illustrated in FIG. 19, after having recorded the communication data as a sampling log, the sampling log generating unit 443 updates the time duration of the sampling interval (S307). For example, the sampling log generating unit 443 randomly updates the time duration of the sampling interval in a range between a minimum value and a maximum value. Now, the minimum value and maximum value are set beforehand to be values that are greater than the time duration of the sampling period. Alternatively, the sampling log generating unit 443 may linearly update the time duration of the sampling interval in a range between the minimum value and maximum value.

Specifically, the sampling log generating unit 443 may gradually increase the time duration of the sampling interval from the minimum value to the maximum value. That is to say, the sampling log generating unit 443 may increase the time duration of the sampling interval from the minimum value to the maximum value in stages. After the time duration of the sampling interval has reached the maximum value, the time duration of the sampling interval may be gradually reduced from the maximum value to the minimum value. That is to say, the sampling log generating unit 443 may decrease the time duration of the sampling interval from the maximum value to the minimum value in stages.

Accordingly, the security ECU 440 can variously change the time duration of the sampling interval relating to sampling logs. Accordingly, at the security ECU 440, the sampling logs can be made to include abnormalities and so forth not included in fixed sampling intervals. The security ECU 440 can also make the sampling intervals difficult to be analyzed. Accordingly, the security ECU 440 can suppress a phenomenon where an abnormality or the like based on unauthorized data is not included in a sampling log. Note that the sampling log generating unit 443 may update the particular type relating to the sampling log, either in addition up updating of the sampling interval or instead of updating of the sampling interval.

Also, in the above-described log recording processing an instruction regarding the sampling interval or the particular type is output from the output unit 442 included in the communication unit 448, for example, to the log generating unit 520 made up of the sampling log generating unit 443. The sampling interval or particular type is then updated in accordance with the instruction relating to the sampling interval or particular type.

Figure 20:
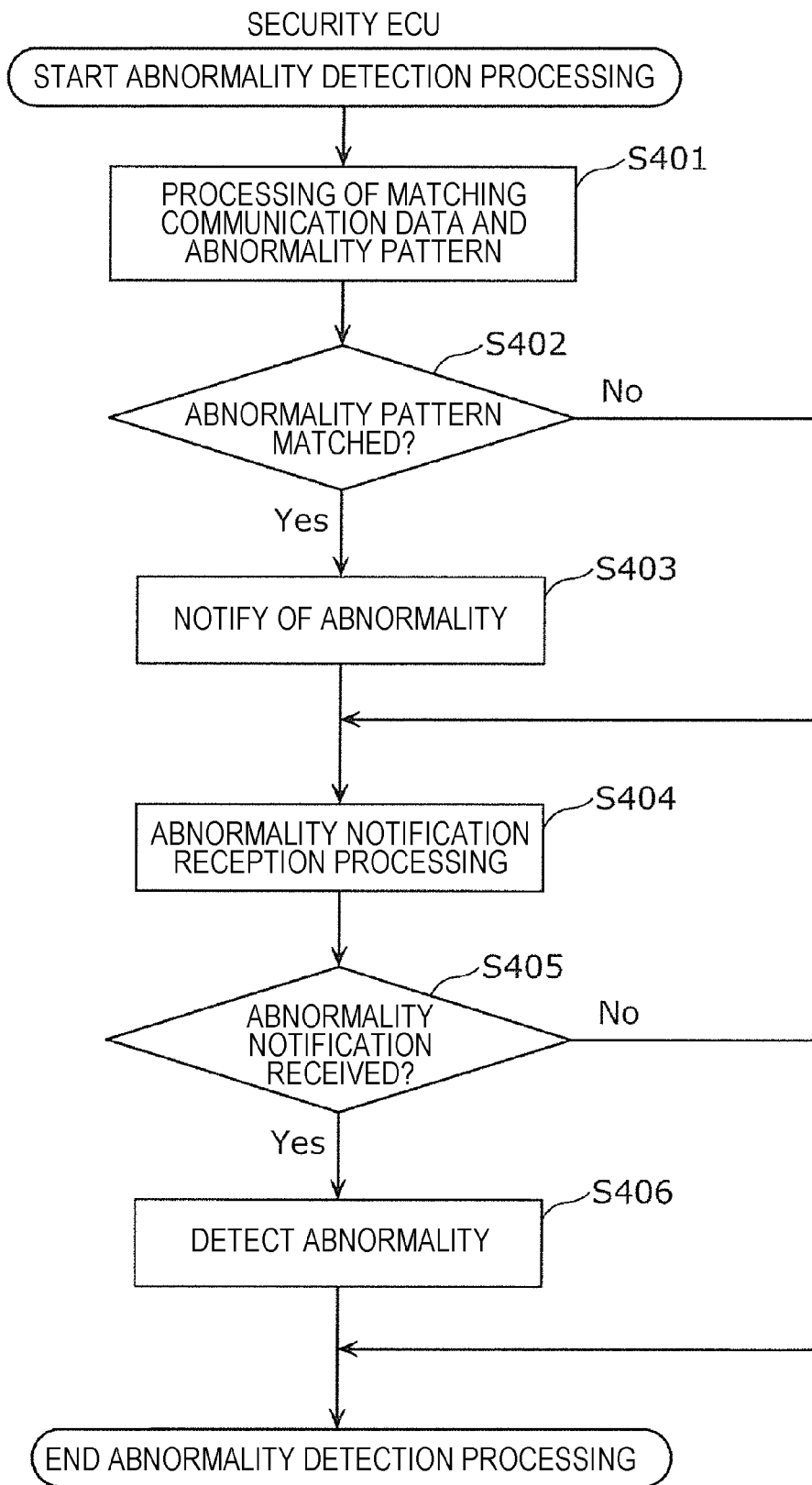
FIG. 20 is a flowchart illustrating abnormality detection processing carried out at the security ECU in a specific example.

FIG. 20 is a flowchart illustrating abnormality detection processing performed at the security ECU 440 illustrated in FIG. 9 and so forth.

In the abnormality detection processing, the abnormality detecting unit 445 performs processing of matching communication data obtained by the communication unit 448 with an abnormality pattern (S401). That is to say, the abnormality detecting unit 445 determines whether or not the communication data obtained by the communication unit 448 matches an abnormality pattern that is set beforehand. Here, the communication data obtained by the communication unit 448 more specifically is one or more data frames obtained by the communication unit 448 as communication data.

In a case of determining that the communication data obtained by the communication unit 448 matches the abnormality pattern set beforehand (Yes in S402), the abnormality detecting unit 445 detects an abnormality (S403). In other words, the abnormality detecting unit 445 detects the communication data obtained by the communication unit 448 matching the abnormality pattern set beforehand as an abnormality in the communication data.

The communication unit 448 also performs abnormality notification reception processing to receive an abnormality notification from the server device 300 (S404). Specifically, in a case where an abnormality notification has been transmitted from the server device 300, the communication unit 448 receives the abnormality notification transmitted from the server device 300.

In a case where the communication unit 448 has received an abnormality notification from the server device 300 (Yes in S405), the abnormality detecting unit 445 detects an abnormality (S406). In other words, in this case, the abnormality detecting unit 445 determines that an abnormality is included in the communication data. Further in other words, the abnormality detecting unit 445 detects the communication unit 448 having received an abnormality notification from the server device 300 as being an abnormality in the communication data.

Also, in a case where determination is made that the communication data obtained by the communication unit 448 does not match the abnormality pattern set beforehand, and the communication unit 448 has not received an abnormality notification from the server device 300, the abnormality detecting unit 445 does not detect an abnormality. That is to say, in this case, the abnormality detecting unit 445 determines that no abnormality is included in the communication data.

Note that matching processing between communication data and an abnormality pattern is performed in the above-described abnormality detection processing, but matching processing may be performed between communication data and a normal pattern. In this case, in a case where determination is made that the communication data does not match a normal pattern set beforehand, the abnormality detecting unit 445 detects an abnormality.

Data frames of the same type are assumed to flow over the CAN at a certain cycle. Accordingly, in a case where data frames of the same type are not flowing at a certain cycle, the abnormality detecting unit 445 may detect an abnormality. Specifically, an arrangement may be made where the abnormality detecting unit 445 determines whether or not data frames are flowing at a certain cycle, using the time interval of obtaining data frames, and detect abnormality in accordance with the results of determination. The abnormal pattern or normal pattern may include the cycle of data frames of the same type that flow over the CAN.

It is also assumed that multiple data frames of the same type that flow at a certain cycle have continuity in contents of data. For example, out of multiple data frames of the same type, the abnormality detecting unit 445 may detect a data frame having a data value that markedly deviates from the data value of the previous data frame as being an abnormality. The abnormal pattern or normal pattern may include the magnitude of deviation. The magnitude of deviation is also expressed as difference in data values.

The timing of the abnormality notification reception processing (S404) is not restricted to the example in FIG. 20. The communication unit 448 receives the abnormality notification transmitted from the server device 300 at the timing of the abnormality notification having been transmitted from the server device 300.

The security ECU 440 may perform only one of its own abnormality detection (S401 through S403) and abnormality detection based on the server device 300 (S404 through S406).

A configuration where the security ECU 440 performs its own abnormality detection (S401 through S403) corresponds to a configuration in FIG. 7 where the abnormality detection unit 510 is included in the security ECU 440. The configuration where the security ECU 440 performs abnormality detection based on the server device 300 (S404 through S406) corresponds to a configuration in FIG. 7 where the abnormality detection unit 510 is included in the server device 300.

A configuration where the security ECU 440 performs its own abnormality detection (S401 through S403) and abnormality detection based on the server device 300 (S404 through S406) corresponds to a configuration where the abnormality detection unit 510 is included in each of the security ECU 440 and the server device 300.

Figure 21:
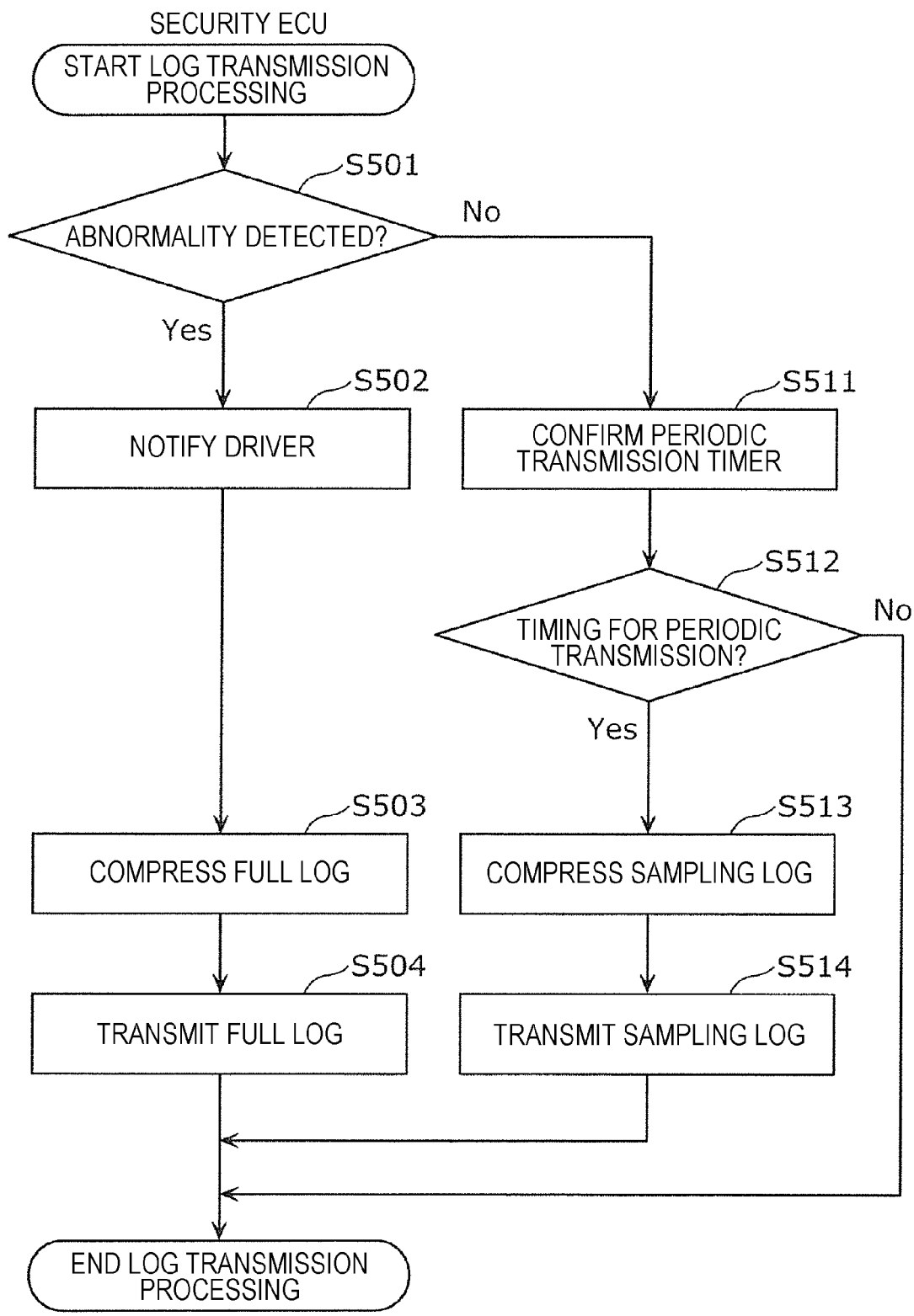
FIG. 21 is a flowchart illustrating a first form of log transmission processing carried out at the security ECU in a specific example.

FIG. 21 is a flowchart illustrating a first form of log transmission processing performed at the security ECU 440 illustrated in FIG. 9 and so forth.

In this form, the abnormality detecting unit 445 determines whether or not an abnormality has been detected in communication data (S501). In a case where determination is made that an abnormality has been detected in communication data, i.e., in a case where determination is made that an abnormality is included in communication data, the communication unit 448 notifies the driver of the abnormality (S502). For example, the communication unit 448 notifies the driver of the abnormality via a notification interface, by outputting the abnormality notification to an ECU 450 having a notification interface.

The communication unit 448 then compresses a full log recorded in the accumulating unit 447 (S503). For example, the communication unit 448 reversibly compresses the full log using a compression format such as 7z or the like. The communication unit 448 transmits the compressed full log to the server device 300 (S504). The communication unit 448 may delete the full log recorded in the accumulating unit 447 from the accumulating unit 447 after transmission of the full log.

In the other hand, in a case where determination is made that no abnormality has been detected in communication data, i.e., in a case where determination is made that the communication data includes no abnormality, the communication unit 448 determines whether or not the current time is the timing for periodic transmission, by confirming a periodic transmission timer (S511). In a case where determination is made that the current time is not the timing of periodic transmission (No in S512), the security ECU 440 ends the log transmission processing.

In a case where determination is made that the current time is the timing of periodic transmission (Yes in S512), the communication unit 448 compresses a sampling log recorded in the accumulating unit 447 (S513). For example, the communication unit 448 reversibly compresses the sampling log using a compression format such as 7z or the like. The communication unit 448 transmits the compressed sampling log to the server device 300 (S514). The communication unit 448 may delete the sampling log recorded in the accumulating unit 447 from the accumulating unit 447 after transmission of the sampling log.

Due to the above-described log transmission processing, sampling logs that have relatively small data amount are periodically transmitted from the security ECU 440 to the server device 300, and full logs that have relatively large data amount are transmitted at the time of an abnormality.

The periodic transmission timing is, for example, once a minute. In a case where one minute or more has elapsed after having transmitted the previous sampling log, the communication unit 448 may determine that the current time is the periodic transmission timing. Accordingly, the communication unit 448 periodically transmits sampling logs. Basically, the cycle of sampling logs being transmitted is longer than the sampling interval relating to recording sampling logs.

Also, a full log transmitted to the server device 300, for example, is a full log of a predetermined period in the past. The predetermined period is, for example, one hour. The accumulating unit 447 may record a full log of the predetermined period worth. To this end, a ring buffer for recording a full log of the predetermined period worth may be used to record the full log. In the same way, with regard to recording sampling logs, a ring buffer may be used for recording a sampling log of the transmission cycle worth.

In a case where an abnormality is detected in the above-described log transmission processing, a full log is transmitted and no sampling log is transmitted. However, sampling logs may be periodically transmitted regardless of whether an abnormality has been detected or not.

In the above-described log transmission processing, the obtaining unit 441 included in the communication unit 448 obtains abnormality detection results from the abnormality detecting unit 445. At the communication unit 448, a transmission instruction for a sampling log or full log is output from the output unit 442 to the transmitting unit 530 in accordance with the abnormality detection results. A sampling log or full log is then transmitted in accordance with the transmission instruction.

Figure 22:
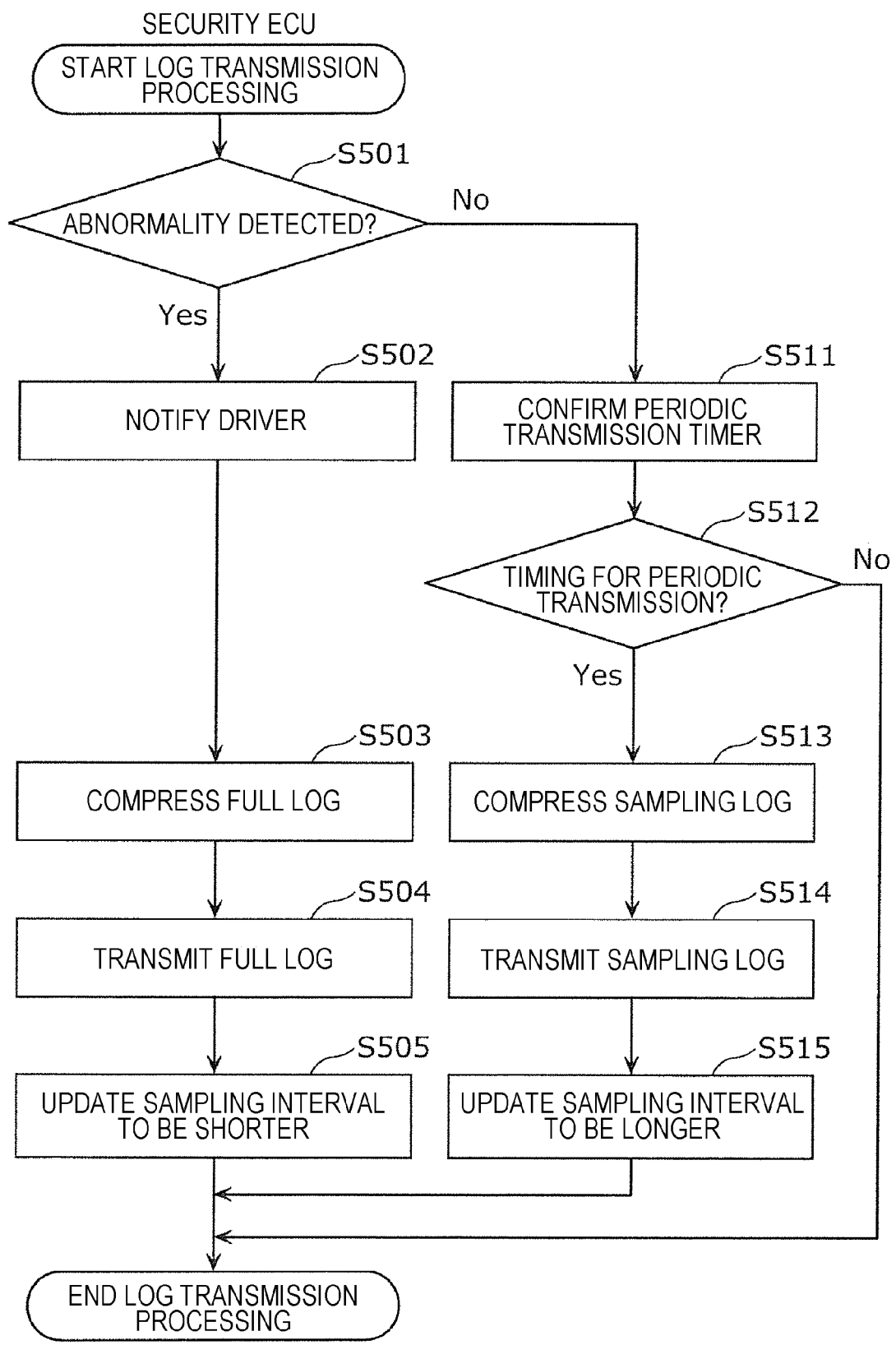
FIG. 22 is a flowchart illustrating a second form of log transmission processing carried out at the security ECU in a specific example.

FIG. 22 is a flowchart illustrating a second form of log transmission processing performed at the security ECU 440 illustrated in FIG. 9 and so forth. In the second form of log transmission processing illustrated in FIG. 22, the processing up to transmission of a full log and sampling log (S501 through S504 and S511 through S514) is the same as the first form in the log transmission processing illustrated in FIG. 21.

In this form, after a full log has been transmitted, the sampling log generating unit 443 updates the sampling interval so as to be shorter (S505). That is to say, in a case where an abnormality has been detected, the sampling log generating unit 443 reduces the time duration of the sampling interval. Also, after a sampling log has been transmitted, the sampling log generating unit 443 updates the sampling interval so as to be longer (S515). That is to say, in a case where no abnormality has been detected, the sampling log generating unit 443 increases the time duration of the sampling interval.

In the above-described updating, the sampling log generating unit 443 updates the time duration of the sampling interval within a range between a minimum value and a maximum value. The sampling log generating unit 443 may decrease or increase the time duration of the sampling interval by a fixed length worth decided beforehand in each updating. The sampling log generating unit 443 may decrease or increase the time duration of the sampling interval by a random length in each updating.

By updating such as described above, the security ECU 440 can increase the data amount of sampling logs after an abnormality has occurred. The security ECU 440 can cause sampling logs to include abnormalities or the like that would not be included in long sampling intervals. Also, if there is no abnormality, the security ECU 440 can reduce the data amount of sampling logs.

Note that in this form, sampling intervals are updated regarding all types, regardless of the type of communication data regarding which an abnormality has been detected. That is to say, the sampling interval is updated for all IDs, regardless of the ID of the frame regarding which an abnormality has been detected.

Also, in the above-described updating, an instruction relating to sampling interval is output from the output unit 442 included in the communication unit 448 to the sampling log generating unit 443 making up the log generating unit 520, for example. The sampling interval is then update in accordance with the instruction regarding the sampling interval.

Figure 23:
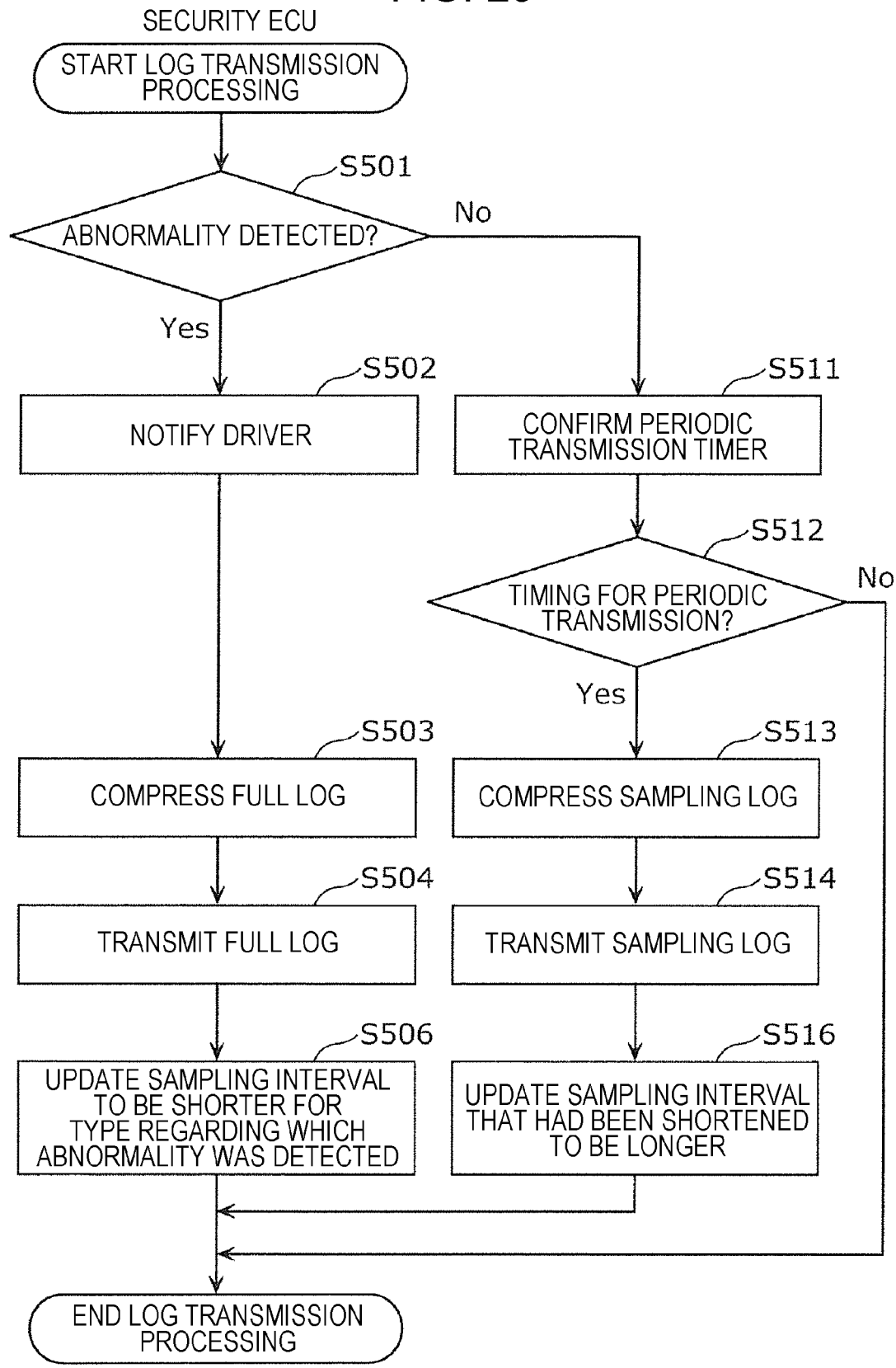
FIG. 23 is a flowchart illustrating a third form of log transmission processing carried out at the security ECU in a specific example.

FIG. 23 is a flowchart illustrating a third form of log transmission processing performed at the security ECU 440 illustrated in FIG. 9 and so forth. In the third form of log transmission processing illustrated in FIG. 23, the processing up to transmission of a full log and sampling log (S501 through S504 and S511 through S514) is the same as the first form and second form in the log transmission processing illustrated in FIG. 21 and FIG. 22.

In this form, after a full log has been transmitted, the sampling log generating unit 443 updates the sampling interval so as to be shorter for the type of communication data regarding which an abnormality has been detected (S506). The sampling log generating unit 443 maintains the same sampling interval for other types. That is to say, in a case where an abnormality has been detected regarding one type of communication data, the sampling log generating unit 443 reduces the time duration of the sampling interval of that one type.

Also, after a sampling log has been transmitted, the sampling log generating unit 443 updates the sampling interval that had been updated shorter so as to be longer (S516). That is to say, in a case where no abnormality has been detected, the sampling log generating unit 443 returns the time duration of the sampling interval to the original time duration. Alternatively, in this case, the sampling log generating unit 443 brings the time duration of the sampling interval closer to the original time duration.

In the same way as in the second form of log transmission processing illustrated in FIG. 22, the sampling log generating unit 443 updates the time duration of the sampling interval within a range between a minimum value and a maximum value. The sampling log generating unit 443 may decrease or increase the time duration of the sampling interval by a fixed length worth decided beforehand in each updating. The sampling log generating unit 443 may decrease or increase the time duration of the sampling interval by a random length in each updating.

By updating such as described above, the security ECU 440 can increase the data amount of sampling logs after an abnormality has occurred by individual types. Also, if there is no abnormality, the security ECU 440 can reduce the data amount of sampling logs that had been increased.

Figure 24:
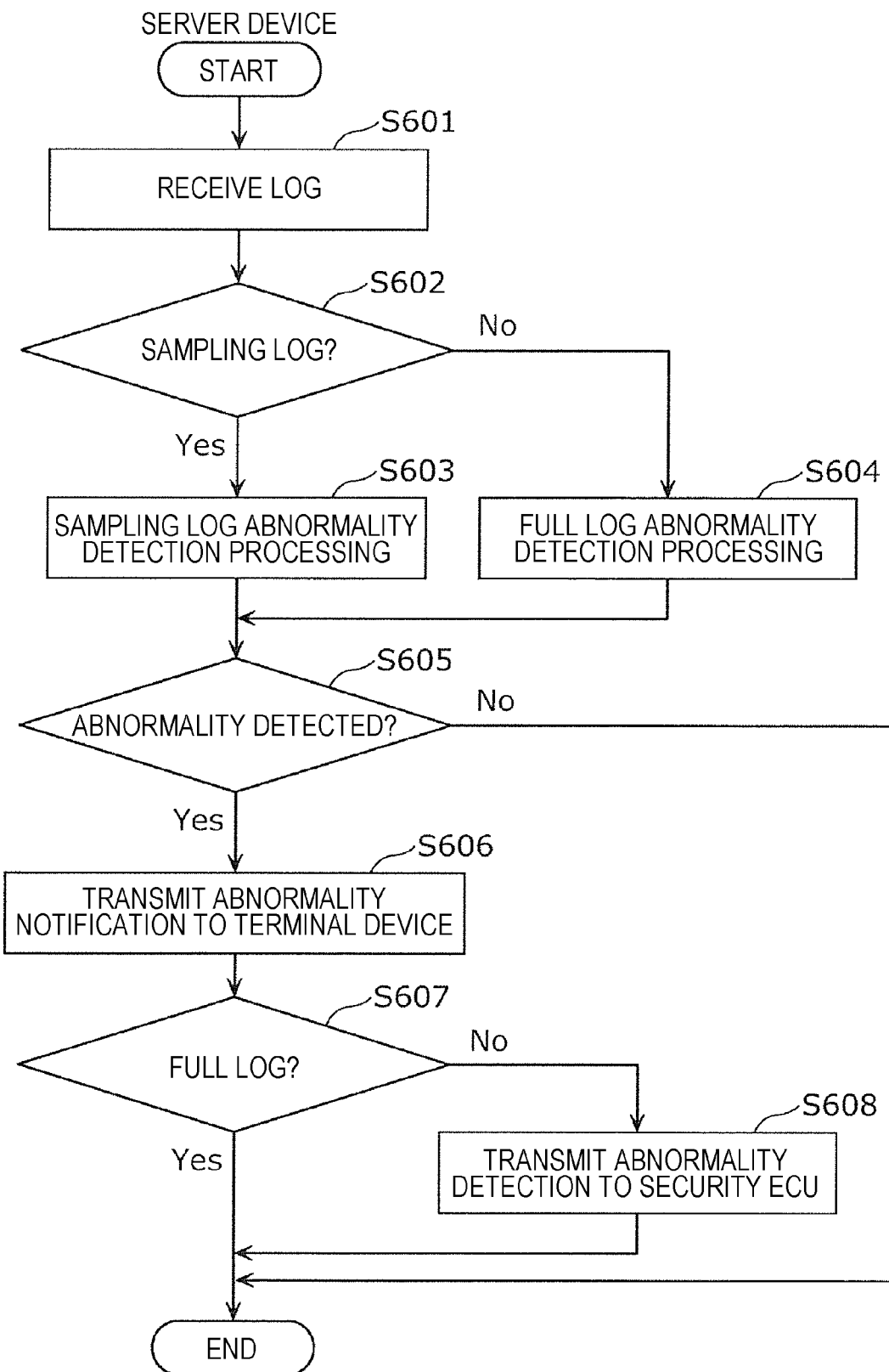
FIG. 24 is a flowchart illustrating a first form of operations of the server device in a specific example.

FIG. 24 is a flowchart illustrating a first form of operations of the server device 300 illustrated in FIG. 9 and so forth.

First, the communication unit 348 receives a sampling log or full log from the security ECU 440 (S601). In a case where a sampling log has been received (Yes in S602), the sampling log processing unit 343 records the sampling log in the accumulating unit 347. For example, the sampling log processing unit 343 decompresses the compressed sampling log, and records the decompressed sampling log in the accumulating unit 347.

The abnormality detecting unit 345 performs abnormality detection processing in accordance with the sampling log (S603). For example, the abnormality detecting unit 345 performs processing of matching the communication data with an abnormality pattern, in the same way as with the matching processing that the abnormality detecting unit 445 of the security ECU 440 performs (S401). Note however, that the abnormality detecting unit 345 uses the communication data indicated by the sampling log for the matching processing.

That is to say, the abnormality detecting unit 345 determines whether or not the communication data indicated by the sampling log matches the abnormality pattern that has been set beforehand. More specifically, the abnormality detecting unit 345 determines whether or not the data frame indicated by the sampling log matches the abnormality pattern set beforehand.

In a case of determining that the communication data indicated by the sampling log matches the abnormality pattern set beforehand, the abnormality detecting unit 345 detects an abnormality. In other words, the abnormality detecting unit 345 in this case determines that an abnormality is included in the communication data. In further other words, the abnormality detecting unit 345 detects the communication data indicated by the sampling log matching the abnormality pattern set beforehand as an abnormality in the communication data.

In the log reception (S601), in a case where a sampling log has not been received (No in S602), i.e., in a case where a full log has been received, the full log processing unit 344 records the full log in the accumulating unit 347. For example, the full log processing unit 344 decompresses the compressed full log, and records the decompressed full log in the accumulating unit 347.

The abnormality detecting unit 345 performs abnormality detection processing in accordance with the full log (S604). For example, the abnormality detecting unit 345 performs processing of matching the communication data with an abnormality pattern, in the same way as with the matching processing that the abnormality detecting unit 445 of the security ECU 440 performs (S401). Note however, that the abnormality detecting unit 345 uses the communication data indicated by the full log in matching processing.

That is to say, the abnormality detecting unit 345 determines whether or not the communication data indicated by the full log matches the abnormality pattern set beforehand. More specifically, the abnormality detecting unit 345 determines whether or not the frame indicated by the full log matches the abnormality pattern set beforehand.

In a case where determination is made that the communication data indicated by the full log matches the abnormality pattern set beforehand, the abnormality detecting unit 345 detects an abnormality. In other words, the abnormality detecting unit 345 in this case determines that an abnormality is included in the communication data. In further other words, the abnormality detecting unit 345 detects the communication data indicated by the full log matching the abnormality pattern set beforehand as an abnormality in the communication data.

Next, the abnormality detecting unit 345 determines whether or not an abnormality has been detected in the communication data (S605). In a case where determination is made that an abnormality has been detected in the communication data, i.e., in a case where determination has been made that an abnormality is included in the communication data (Yes in S605), the communication unit 348 transmits an abnormality notification to the terminal device 200 (S606). In the log reception (S601), in a case where a full log has been received (Yes in S607), the server device 300 ends the series of processing.

In the log reception (S601), in a case where a full log has not been received (No in S607), i.e., in a case where a sampling log has been received, the communication unit 348 transmits an abnormality notification to the security ECU 440 (S608). The communication unit 348 causes the security ECU 440 to transmit a full log to the server device 300 by transmitting the abnormality notification to the security ECU 440. The server device 300 then ends the series of processing.

Although the sampling log abnormality detection processing (S603) and full log abnormality detection processing (S604) are listed separately in FIG. 24, these may be common processing. That is to say, the abnormality detecting unit 345 may perform common abnormality detection processing, regardless of whether a sampling log or full log.

Also, while matching processing between communication data and an abnormality pattern is performed in the above-described abnormality detection processing (S603 and S604), matching processing may be performed between communication data and a normal pattern. In this case, in a case where determination is made that the communication data does not match a normal pattern set beforehand, the abnormality detecting unit 345 detects an abnormality.

Also, matching processing that is more complicated than the matching processing performed at the security ECU 440 (S401) may be performed in the above-described abnormality detection processing (S603 and S604). The server device 300 can use plentiful computation resources, unrestricted by onboard requirements, to perform matching processing. For example, a greater number of abnormality patterns than in the matching processing performed at the security ECU 440 (S401) may be performed in the above-described abnormality detection processing (S603 and S604).

Data frames of the same type are assumed to flow over the CAN at a certain cycle. Accordingly, in a case where data frames of the same type are not flowing at a certain cycle, the abnormality detecting unit 345 may detect an abnormality. Specifically, an arrangement may be made where the abnormality detecting unit 345 determines whether or not data frames are flowing at a certain cycle, using the time interval of obtaining data frames, and detect abnormality in accordance with the results of determination. The abnormal pattern or normal pattern may include the cycle of data frames of the same type that flow over the CAN.

Note however, that determination of whether data frames are flowing at a certain cycle is valid in a case where the previous data frame is not missing, and is not effective in a case where the previous data frame is missing.

Accordingly, in a case where the data frame included in the sampling log is the first data frame in the sampling period, the abnormality detecting unit 345 does not use determination of whether or not the data frames are flowing at a certain cycle in determination of whether or not there is an abnormality. On the other hand, in a case where the data frame included in the sampling log is not the first data frame in the sampling period, the abnormality detecting unit 345 uses determination of whether or not the data frames are flowing at a certain cycle in determination of whether or not there is an abnormality.

Specifically, in a case where the data frame included in the sampling log is not the first data frame in the sampling period, the abnormality detecting unit 345 uses the difference between the sampling time of the data frame and the sampling time of the previous data frame for detection of an abnormality. In a case where the difference in sampling times fits the certain period interval, the abnormality detecting unit 345 determines the data frame to be normal. On the other hand, in a case where the difference in sampling times does not fit the certain period interval, the abnormality detecting unit 345 determines the data frame to be abnormal.

The type also relates to the cycle, so the difference in sampling times relating to data frames of the same type may be used for detecting an abnormality. That is to say, the difference between the sampling time of the data frame and the sampling time of the previous data frame may be for detection of an abnormality in the same sampling period and same type.

Whether the data frame included in the sampling log is the first data frame or not can be identified by the flag of the log format illustrated in FIG. 4. Also, the difference of sampling time may be used for detection of abnormalities in full logs, since there are no missing data frames in full logs.

It is also assumed that multiple data frames of the same type that flow at a certain cycle have continuity in contents of data. Accordingly, the difference in data values between a data frame and a preceding data frame may be used for detecting an abnormality, in the same way as with the difference in sampling times. In this case as well, the difference in data values may be used for detection of an abnormality in data frames other than the first data frame, in the same way as with difference in sampling time.

Figure 25:
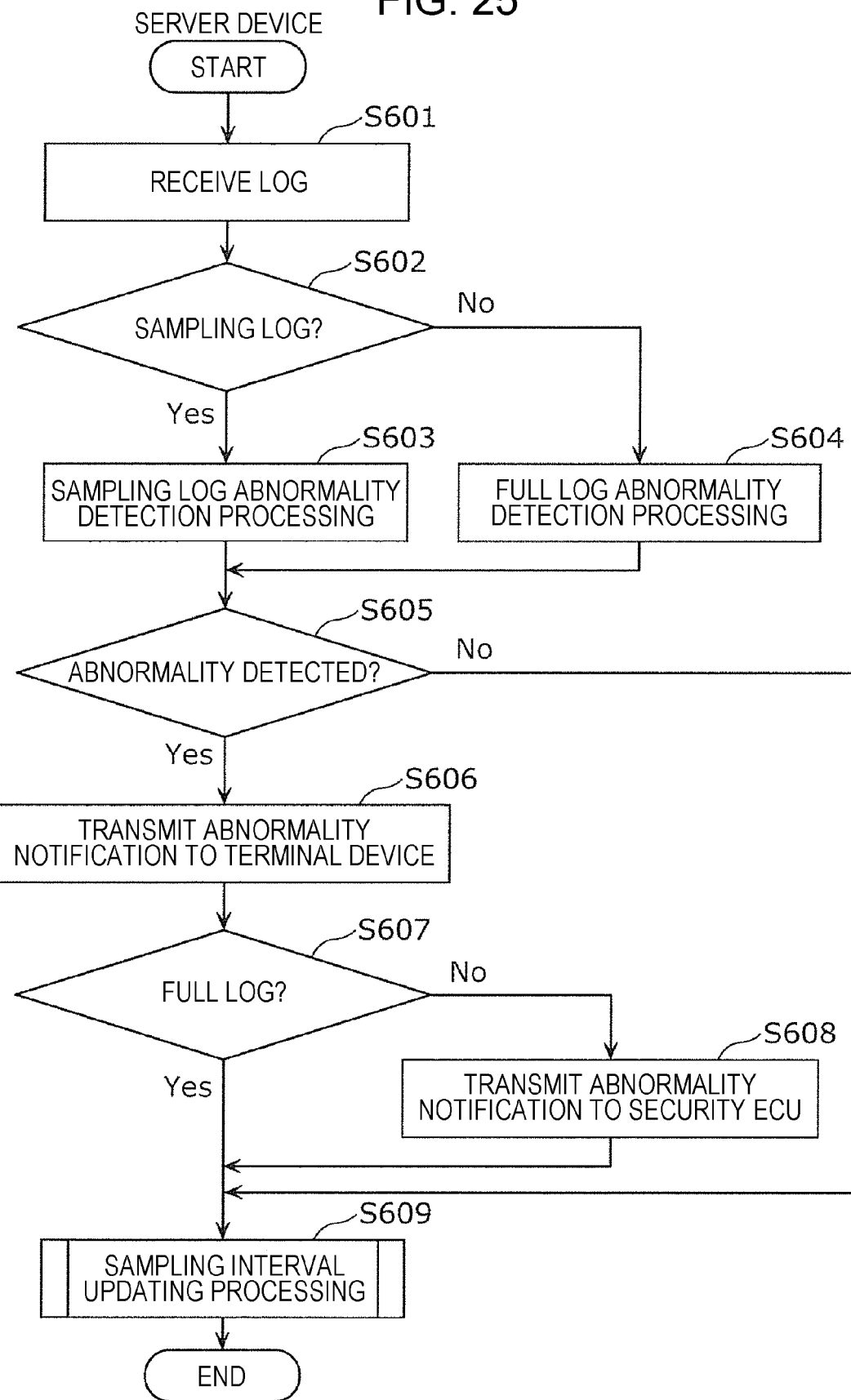
FIG. 25 is a flowchart illustrating a second form of operations of the server device in a specific example.

FIG. 25 is a flowchart illustrating a second form of the operations of the server device 300 illustrated in FIG. 9 and so forth. In the second form illustrated in FIG. 25, the processing from receiving a log up to transmitting an abnormality notification (S601 through S608) is the same as that of the first from illustrated in FIG. 24.

Thereafter, the server device 300 performs sampling interval updating processing (S609) in this form. For example, the communication unit 348 transmits a change instruction to change the time duration of the sampling interval to the security ECU 440. The security ECU 440 changes the time duration of the sampling interval. FIG. 26 and FIG. 27 illustrate more specific forms relating to the above sampling interval updating processing.

FIG. 26 is a flowchart illustrating a first form of sampling interval updating processing carried out at the server device 300 and security ECU 440 illustrated in FIG. 9 and so forth.

In the present form, first, the communication unit 348 at the server device 300 identifies the vehicle type of vehicle 400 that is the transmission source of the log (S701) received in the reception of the log (S601). The communication unit 348 may identify the vehicle type of the vehicle 400 in accordance with the vehicle ID included in the log. Alternatively, the communication unit 348 may identify the vehicle type of the vehicle 400 by newly performing communication with the security ECU 440 or the like.

Next, the communication unit 348 obtains the current sampling interval of the identified vehicle type (S702). The current sampling interval may be recorded in the accumulating unit 347 for each vehicle type. The communication unit 348 may thus obtain the current sampling interval from the accumulating unit 347. Alternatively, the communication unit 348 may obtain the current sampling interval by newly performing communication with the security ECU 440 or the like.

In a case where an abnormality is detected (Yes in S703) in the abnormality detection processing (S603 or S604), the communication unit 348 updates the sampling interval so as to be shorter (S704). That is to say, the communication unit 348 sets a sampling interval shorter than the current sampling interval.

On the other hand, in a case where an abnormality is not detected (No in S703) in the abnormality detection processing (S603 or S604), the communication unit 348 updates the sampling interval so as to be longer (S705). That is to say, the communication unit 348 sets a sampling interval longer than the current sampling interval.

The communication unit 348 then transmits the updated sampling interval, i.e., the newly set sampling interval, to multiple security ECUs of multiple vehicles of which the vehicle type is the same as the identified vehicle type (S706).

At the security ECU 440 included in the multiple security ECUs to which the sampling interval has been transmitted, the communication unit 448 receives the sampling interval transmitted from the server device 300 (S801). The sampling log generating unit 443 then updates the current sampling interval to the received sampling interval (S802). That is to say, the communication unit 448 receives the sampling interval change instruction from the server device 300 as an external instruction, and the sampling log generating unit 443 updates the sampling interval in accordance with the external instruction.

Accordingly, the server device 300 can increase the data amount of sampling logs after an abnormality has occurred. The server device 300 can cause sampling logs to include abnormalities or the like that would not be included in long sampling intervals. Also, if there is no abnormality, the server device 300 can reduce the data amount of sampling logs. Also, the server device 300 can change the time duration of sampling intervals relating to sampling logs in multiple onboard systems of the same vehicle type.

The communication unit 348 may update sampling intervals separately for each type. For example, in a case where an abnormality is detected regarding one type, the communication unit 348 may shorten the sampling interval for that one type. In a case where an abnormality is not detected, the communication unit 348 may lengthen the shortened sampling interval. This sort of updating may be performed regarding vehicles of the same vehicle type. Accordingly, data amounts can be appropriately adjusted for each vehicle type and each type.

Alternatively, in a case where an abnormality is detected regarding one type, the communication unit 348 may shorten the sampling intervals for all types, regardless of type. In a case where an abnormality is not detected, the communication unit 348 may lengthen the sampling intervals for all types, regardless of type. Accordingly, the data amount can be appropriately adjusted for each vehicle type, regardless of type.

FIG. 27 is a flowchart illustrating a second form of sampling interval changing processing carried out at the server device 300 and security ECU 440 illustrated in FIG. 9 and so forth.

In the present form, first, the communication unit 348 at the server device 300 identifies the region of the vehicle 400 that is the transmission source of the log (S711) received in the reception of the log (S601). The communication unit 348 may identify the region of the vehicle 400 in accordance with the vehicle ID included in the log. Alternatively, the communication unit 348 may identify the region of the vehicle 400 by newly performing communication with the security ECU 440 or the like.

Basically, a large range such as a nation, is assumed as a region. Such a region can be set regarding the vehicle 400 beforehand. However, a specific region where the vehicle 400 currently is traveling may be used. Such a region can be identified by Global Positioning System (GPS) or the like.

Next, the communication unit 348 obtains the current sampling interval of the identified region (S712). The current sampling interval may be recorded in the accumulating unit 347 for each region. The communication unit 348 may thus obtain the current sampling interval from the accumulating unit 347. Alternatively, the communication unit 348 may obtain the current sampling interval by newly performing communication with the security ECU 440 or the like.

In a case where an abnormality is detected (Yes in S713) in the abnormality detection processing (S603 or S604), the communication unit 348 updates the sampling interval so as to be shorter (S714). That is to say, the communication unit 348 sets a sampling interval shorter than the current sampling interval.

On the other hand, in a case where an abnormality is not detected (No in S713) in the abnormality detection processing (S603 or S604), the communication unit 348 updates the sampling interval so as to be longer (S715). That is to say, the communication unit 348 sets a sampling interval longer than the current sampling interval.

The communication unit 348 then transmits the updated sampling interval, i.e., the newly set sampling interval, to multiple security ECUs of multiple vehicles of which the region is the same as the identified region (S716).

At the security ECU 440 included in the multiple security ECUs to which the sampling interval has been transmitted, the communication unit 448 receives the sampling interval transmitted from the server device 300 (S801), in the same way as in the first form of sampling interval updating processing. The sampling log generating unit 443 then updates the current sampling interval to the received sampling interval (S802). That is to say, the security ECU 440 receives the sampling interval change instruction as an external instruction, and updates the sampling interval in accordance with the external instruction. Thus, the server device 300 can change the time duration of sampling intervals relating to sampling logs in multiple onboard systems in the same region.

Also, the communication unit 348 may update the sampling intervals by individual types in the same way as in the first form of the sampling interval updating processing. Accordingly, the data amount can be appropriately adjusted for each region and type. Alternatively, the communication unit 348 may update the sampling interval regardless of types. Accordingly, the data amount can be appropriately adjusted for each region, regardless of type.

Supplement

Although the CAN protocol is used as an onboard network in the above-described embodiment, this is not restrictive. For example, CAN-FD (CAN with Flexible Data Rate), FlexRay, Ethernet, LIN (Local Interconnect Network), MOST (Media Oriented Systems Transport), and so forth may be used. Alternatively, a network may be used where these networks are sub-networks and combined with CAN.

The embodiments described above are applied to achieve high cyber security in the onboard network installed in a vehicle. However, the applications are not limited to those examples. The embodiments may be applied to achieve high security not only in vehicles but also mobilities such as construction machines, farm machines, vessels, railways, airplanes, or the like.

That is, the embodiments described above may be applied to achieve high cyber security in mobility networks and mobility network systems.

Furthermore, the embodiments can also be applied to communication networks used in factories or industrial control systems or can be applied to communication networks for controlling embedded devices.

Note that in the above-described embodiment, the components may be realized by being configured of dedicated hardware, or by executing a software program appropriate for the components. The components may be realized by a program executing unit such as a central processing unit (CPU) or another type of processor or the like reading out and executing a software program recorded in a recording medium such as a hard disk or semiconductor memory or the like. Software that realizes the information processing device and so forth of the above-described embodiment is a program such as follows.

That is to say, the program causes a computer that is an information processing device to execute an information processing method carried out by an information processing device installed in a vehicle. The information processing method includes: an obtaining step of obtaining, from an abnormality detecting unit, abnormality detection results of whether or not there is an abnormality included in communication data on an onboard network of the vehicle; and an outputting step of outputting a sampling log transmission instruction, to cause periodic transmission of a sampling log from a transmission unit installed in the vehicle to a server device provided outside of the vehicle, the sampling log being, out of two types of logs of the communication data, a log having a smaller data amount generated per unit time than another log. In the outputting step, a full log transmission instruction is further output, to cause transmission of a full log from the transmission unit to the server device in a case of the abnormality detection results indicating that an abnormality is included in the communication data having been obtained in the obtaining step, the full log being, out of the two types of logs of the communication data, a log having a larger data amount generated per unit time than the sampling log.

This program may be recorded in a non-transient recording medium such as a CD-ROM or the like. The information processing device may be implemented as an integrated circuit.

The components in the above-described embodiment may be circuits. Multiple components may make up a single circuit as a whole, or may make up individual circuits. The circuits may each be general-purpose circuits, or may be dedicated circuits.

The transmission method for transmitting information from a transmission source to a transmission destination in the above-described embodiment may be a transmission method where information of the transmission source and the transmission destination are not included in the information being transmitted, and it is sufficient as long as it is a transmission method where information is transmitted from the transmission source to the transmission destination as a result. specifically, a transmission method such as broadcasting may be used. This is the same for the output method of outputting information from an output source to an output destination. The obtaining method of obtaining information from an obtaining source also is sufficient as long as it is an obtaining method where information is obtained from an obtaining source as a result.

Although an embodiment has been described based on an information processing device according to one or multiple forms, the present disclosure is not restricted to this embodiment. Forms configured by making various types of modifications conceivable by one skilled in the art on the present embodiment, and those configured by combining components in different embodiments, may also be included in the scope of one or multiple forms.

For example, in the above-described embodiment, processing executed by a particular component may be executed by a different component instead of the particular component. The order of multiple processes may be changed, and multiple processes may be executed in parallel.

The present disclosure is applicable to system securing for monitoring data relating to a vehicle, and so forth.

What is claimed is:

1. An information processing device provided outside of a vehicle, the information processing device comprising:
a processor; and
a memory including at least one set of instructions that, when executed by the processor, causes the processor to perform operations including:
obtaining, from an onboard system of the vehicle, a first log, the first log including, per sampling interval, a first data amount of communication data, the communication data flowing through the onboard system of the vehicle, the communication data corresponding to an onboard network of the vehicle;
determining whether the first log indicates that an abnormality is included in the communication data;
outputting, in a case where the determining determines that the abnormality is included in the communication data, first detection results to the onboard system, the first detection results indicating the abnormality is included in the communication data, and the first detection results including an instruction that instructs the onboard system to transmit a second log to the information processing device, the instruction further instructing the onboard system to shorten the sampling interval; and
outputting, in a case where the determining determines that the abnormality is not included in the communication data and a determination is made that a current timing is a timing of transmitting the first log, a change instruction to the onboard system to lengthen the sampling interval,
wherein the second log includes, per the sampling interval, a second data amount of the communication data, the second data amount being more than the first data amount.

2. The information processing device according to claim 1,
wherein the operations further include:
obtaining the second log from the onboard system after outputting the first detection results; and
further determining whether the abnormality is included in the communication data, using the second log.

3. The information processing device according to claim 2,
wherein,
in a case where the further determining determines that the abnormality is included in the communication data, the information processing device does not output second detection results of the further determining to the onboard system.

4. The information processing device according to claim 1,
wherein the operations further include:
outputting the first detection results to a terminal device in the case where the determining determines that the abnormality is included in the communication data.

5. The information processing device according to claim 1,
wherein the operations further include:
outputting a second change instruction to the onboard system to change a duration of a period during which the first data amount of the communication data, which is included in the first log, is collected per the sampling interval.

6. The information processing device according to claim 5,
wherein the operations further include:
outputting the second change instruction to a plurality of onboard systems of a plurality of vehicles, the plurality of vehicles having a same vehicle type as the vehicle.

7. The information processing device according to claim 5,
wherein the operations further include:
outputting the second change instruction to a plurality of onboard systems of a plurality of vehicles, the plurality of vehicles being in a same region as the vehicle.

8. The information processing device according to claim 1,
wherein the outputting further outputs, in the case where the determining determines that the abnormality is included in the communication data, a second change instruction to the onboard system to increase a duration of a period during which the first data amount of the communication data, which is included in the first log, is collected per the sampling interval.

9. The information processing device according to claim 1,
wherein the operations further include:
outputting a second change instruction to the onboard system to change the sampling interval.

10. The information processing device according to claim 9,
wherein the operations further include:
outputting the second change instruction to a plurality of onboard systems of a plurality of vehicles, the plurality of vehicles having a same vehicle type as the vehicle.

11. The information processing device according to claim 9,
wherein the operations further include:
outputting the second change instruction to a plurality of onboard systems of a plurality of vehicles, the plurality of vehicles being in a same region as the vehicle.

12. The information processing device according to claim 1,
wherein the second log includes a plurality of types of the communication data, and
the first log includes at least one of the plurality of types of the communication data.

13. The information processing device according to claim 1,
wherein the first log is compressed by the onboard system, the second log is compressed by the onboard system, and the operations further include:
decompressing the compressed first log;
obtaining, from the onboard system, the second log that is compressed; and
decompressing the compressed second log.

14. An information processing method performed by an information processing device provided outside of a vehicle, the information processing method comprising:

obtaining, from an onboard system of the vehicle, a first log, the first log including, per sampling interval, a first data amount of communication data, the communication data flowing through the onboard system of the vehicle, the communication data corresponding to an onboard network of the vehicle;

determining whether the first log indicates that an abnormality is included in the communication data; and outputting, in a case where the determining determines that the abnormality is included in the communication data, first detection results to the onboard system, the first detection results indicating the abnormality is included in the communication data, and the first detection results including an instruction that instructs the onboard system to transmit a second log to the information processing device, the instruction further instructing the onboard system to shorten the sampling interval; and outputting, in a case where the determining determines that the abnormality is not included in the communication data and a determination is made that a current timing is a timing of transmitting the first log, a change instruction to the onboard system to lengthen the sampling interval, wherein the second log includes, per the sampling interval, a second data amount of the communication data, the second data amount being more than the data first amount.

* * * * *